United States Patent
Yates

(10) Patent No.: US 9,650,138 B2
(45) Date of Patent: May 16, 2017

(54) LONG RANGE ELECTRIC AIRCRAFT AND METHOD OF OPERATING SAME

(71) Applicant: Flight of the Century, Inc., Aliso Viejo, CA (US)

(72) Inventor: William M. Yates, Aliso Viejo, CA (US)

(73) Assignee: W.MORRISON CONSULTING GROUP, INC., Aliso Viejo, CA (US)

( * ) Notice: Subject to any disclaimer, the term of this patent is extended or adjusted under 35 U.S.C. 154(b) by 31 days.

(21) Appl. No.: 14/882,254

(22) Filed: Oct. 13, 2015

(65) Prior Publication Data

US 2016/0031564 A1 Feb. 4, 2016

Related U.S. Application Data

(63) Continuation-in-part of application No. 13/852,315, filed on Mar. 28, 2013, now Pat. No. 9,340,299.

(60) Provisional application No. 62/064,366, filed on Oct. 15, 2014, provisional application No. 61/618,482, filed on Mar. 30, 2012.

(51) Int. Cl.
| | |
|---|---|
| *B64D 3/00* | (2006.01) |
| *B64D 39/00* | (2006.01) |
| *B64D 33/00* | (2006.01) |
| *B64C 39/02* | (2006.01) |

(52) U.S. Cl.
CPC .............. *B64D 3/00* (2013.01); *B64C 39/024* (2013.01); *B64D 33/00* (2013.01); *B64D 39/00* (2013.01); *B64C 2201/021* (2013.01); *B64C 2201/042* (2013.01); *B64C 2201/066* (2013.01); *B64C 2201/104* (2013.01); *B64C 2201/127* (2013.01); *B64C 2201/187* (2013.01)

(58) Field of Classification Search
CPC .... B64D 39/00; B64D 3/00; B64C 2201/066; B64C 2201/063
See application file for complete search history.

(56) References Cited

U.S. PATENT DOCUMENTS

| | | | |
|---|---|---|---|
| 6,540,179 B2 | 4/2003 | Henderson | |
| 6,604,711 B1 * | 8/2003 | Stevens | B64C 39/024 244/135 A |
| 6,819,982 B2 | 11/2004 | Doane | |
| 7,714,536 B1 | 5/2010 | Silberg et al. | |
| 7,798,449 B2 | 9/2010 | Small et al. | |
| 8,056,860 B2 | 11/2011 | Small et al. | |
| 8,540,183 B2 | 9/2013 | Morris et al. | |
| 8,639,395 B2 | 1/2014 | Hudson | |
| 2002/0074454 A1 | 6/2002 | Henderson | |

(Continued)

FOREIGN PATENT DOCUMENTS

| | | | |
|---|---|---|---|
| FR | 3000029 A1 | 6/2014 | |
| GB | 1131535 A * | 10/1968 | G03B 15/00 |
| WO | 2014011255 A2 | 1/2014 | |

OTHER PUBLICATIONS

Ackerman, Evan. UAV Battery Packs Could Allow Electric Planes to Fly Forever, IEEE Spectrum, Jul. 12, 2012, HTTP://spectrum.ieee.org/automaton/robotics/industrial-robots/uav-battery-packs-could-allow-electric-planes-to-fly-forever.

*Primary Examiner* — Brian M O'Hara
(74) *Attorney, Agent, or Firm* — Dentons US LLP

(57) ABSTRACT

Electric aircraft, including in-flight rechargeable electric aircraft, and methods of operating electric aircraft, including methods for recharging electric aircraft in-flight, and method of deploying and retrieving secondary aircrafts.

14 Claims, 15 Drawing Sheets

(56) References Cited

U.S. PATENT DOCUMENTS

| | | |
|---|---|---|
| 2002/0190162 A1 | 12/2002 | McDonnell |
| 2004/0102876 A1 | 5/2004 | Doane |
| 2006/0000949 A1 | 1/2006 | Schroeder |
| 2006/0000950 A1 | 1/2006 | von Thal et al. |
| 2007/0023575 A1 | 2/2007 | von Thal et al. |
| 2008/0184906 A1 | 8/2008 | Kejha |
| 2009/0045290 A1 | 2/2009 | Small et al. |
| 2010/0025523 A1 | 2/2010 | Kutzmann et al. |
| 2010/0213318 A1 | 8/2010 | Hudson |
| 2010/0321011 A1 | 12/2010 | Small et al. |
| 2011/0139928 A1 | 6/2011 | Morris et al. |
| 2012/0168564 A1 | 7/2012 | Feldmann et al. |
| 2012/0234964 A1 | 9/2012 | Heppe |
| 2013/0037650 A1* | 2/2013 | Heppe .................. B64C 37/02 244/2 |
| 2014/0339371 A1 | 11/2014 | Yates et al. |
| 2015/0336677 A1 | 11/2015 | Smaoui et al. |

\* cited by examiner

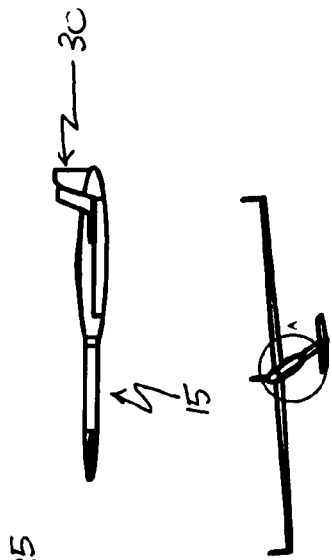
FIG. 1(a)
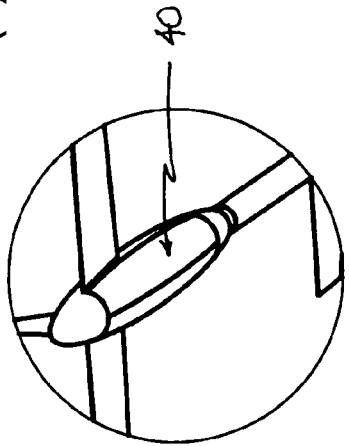
FIG. 1(d)
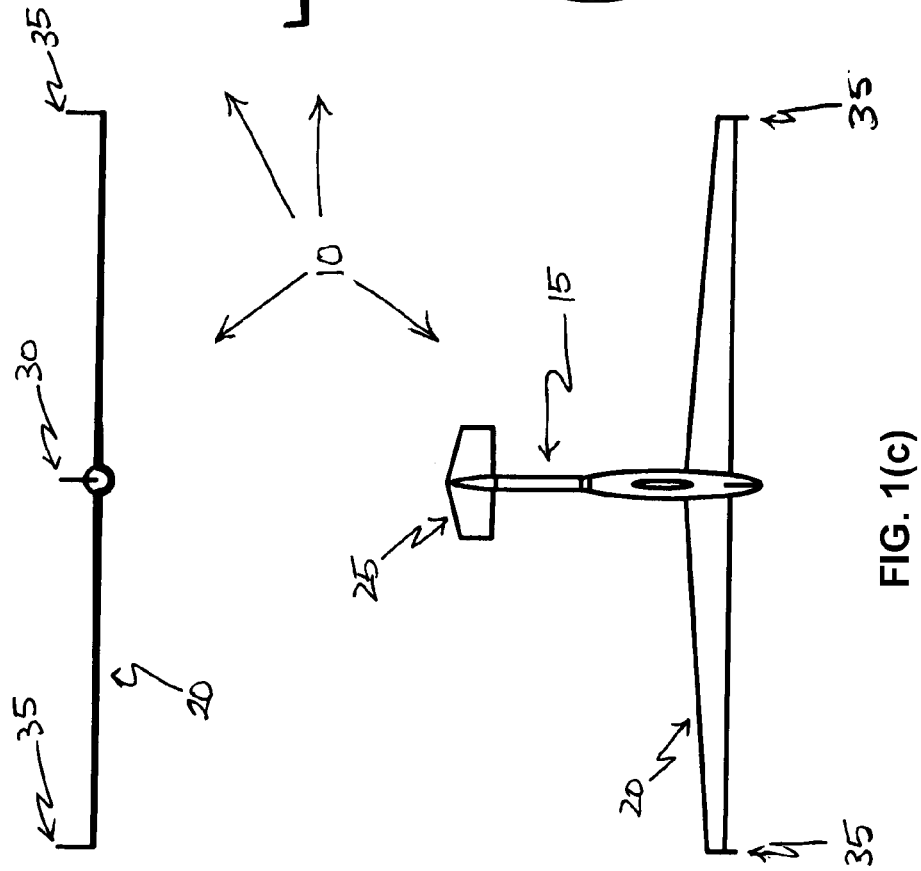
FIG. 1(b)
FIG. 1(c)

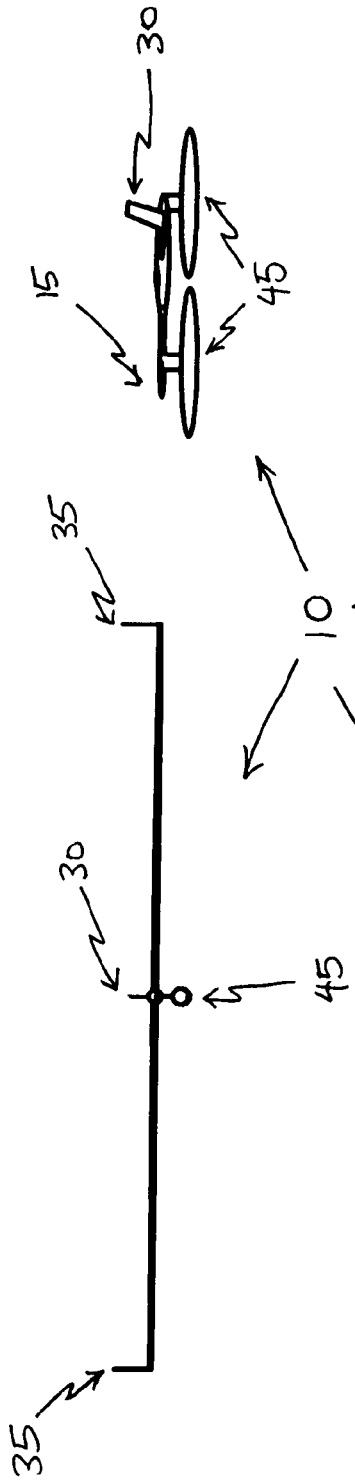

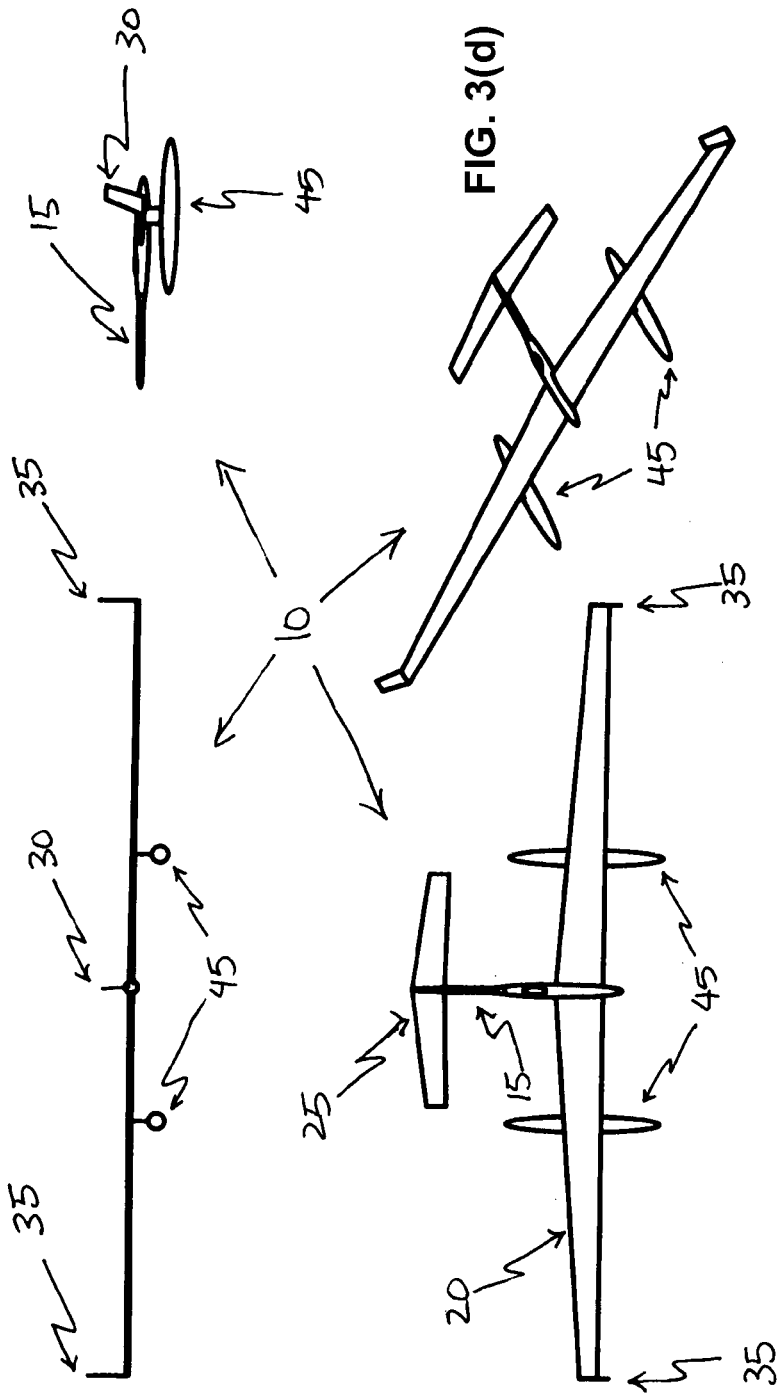

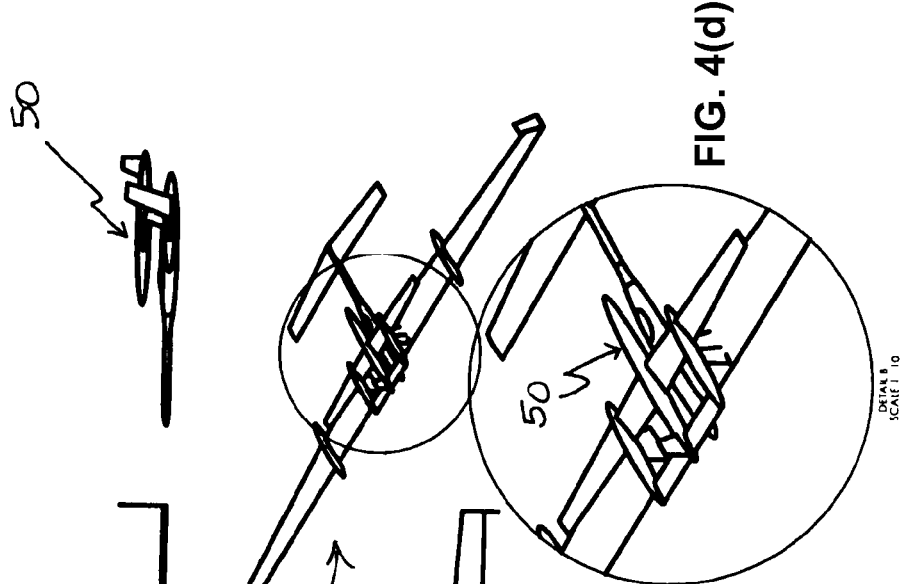
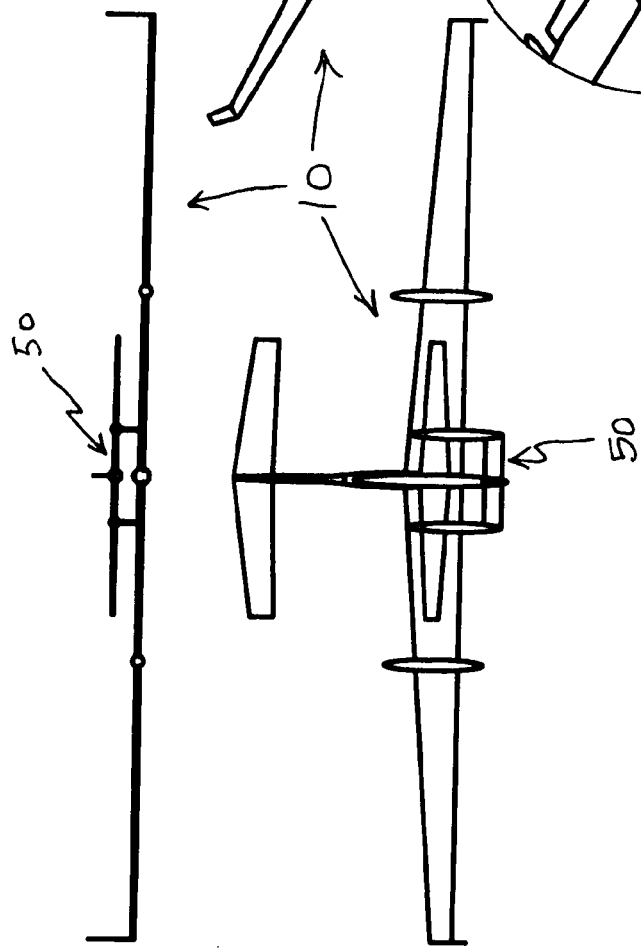

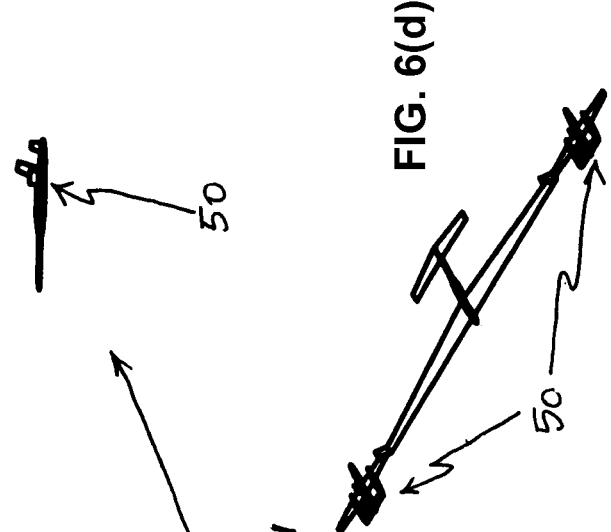
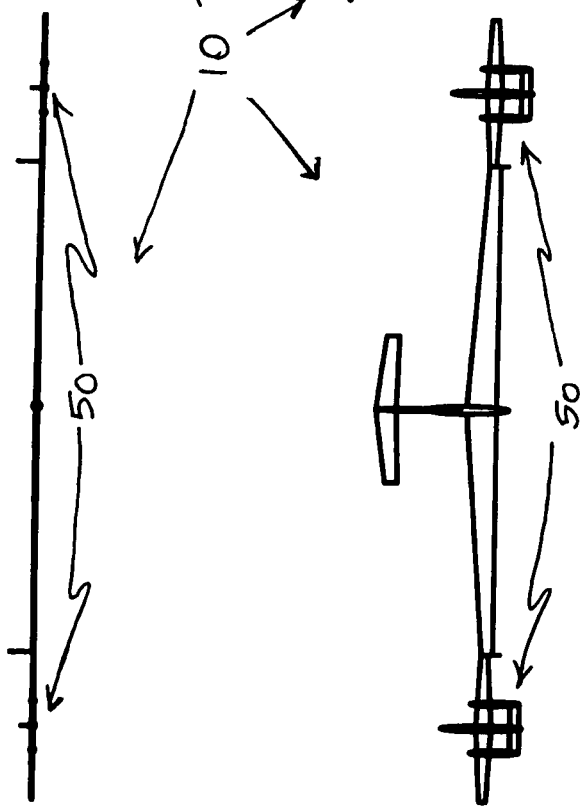

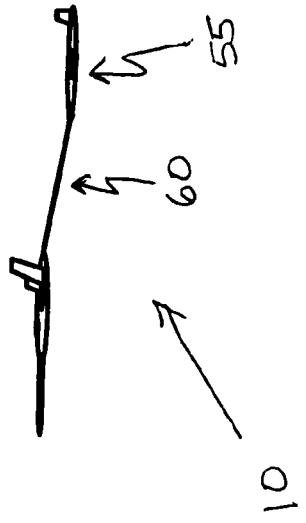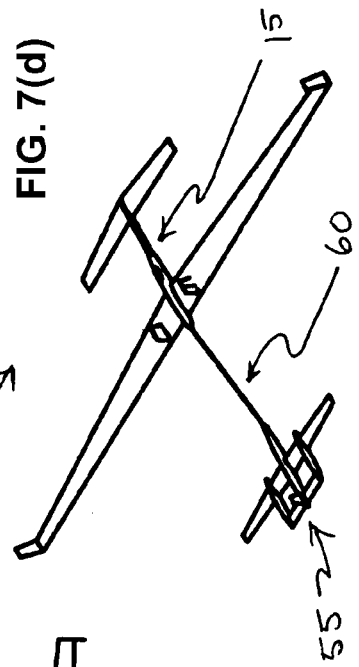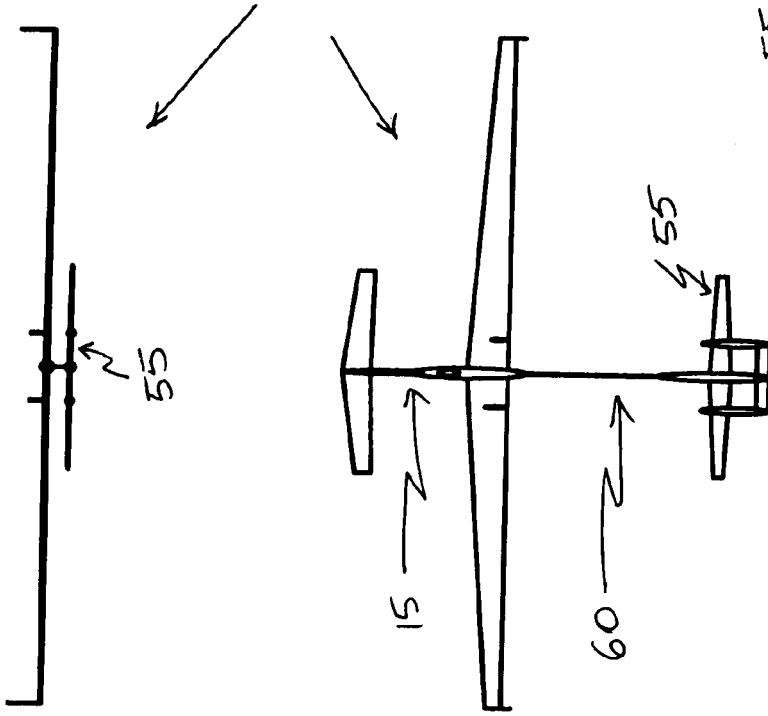

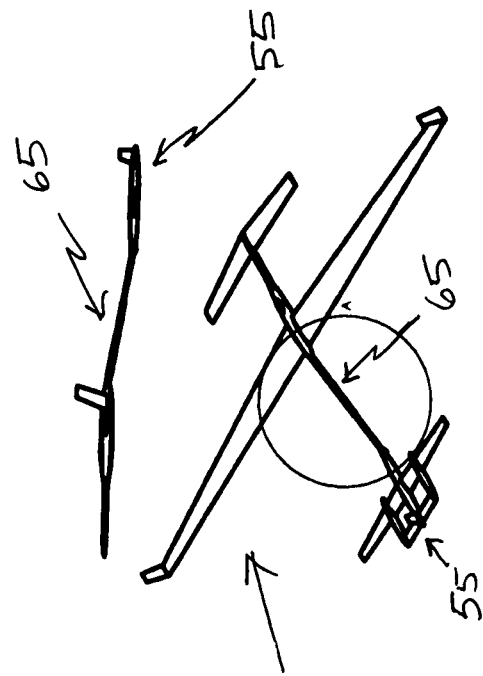
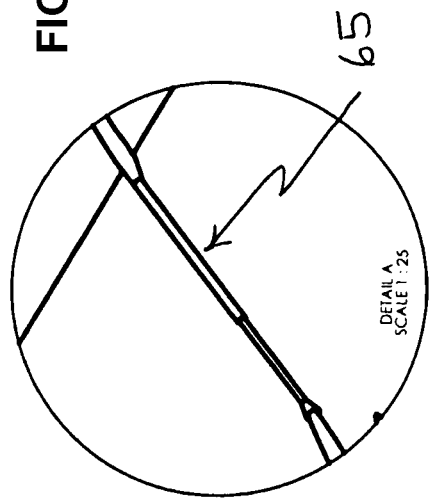
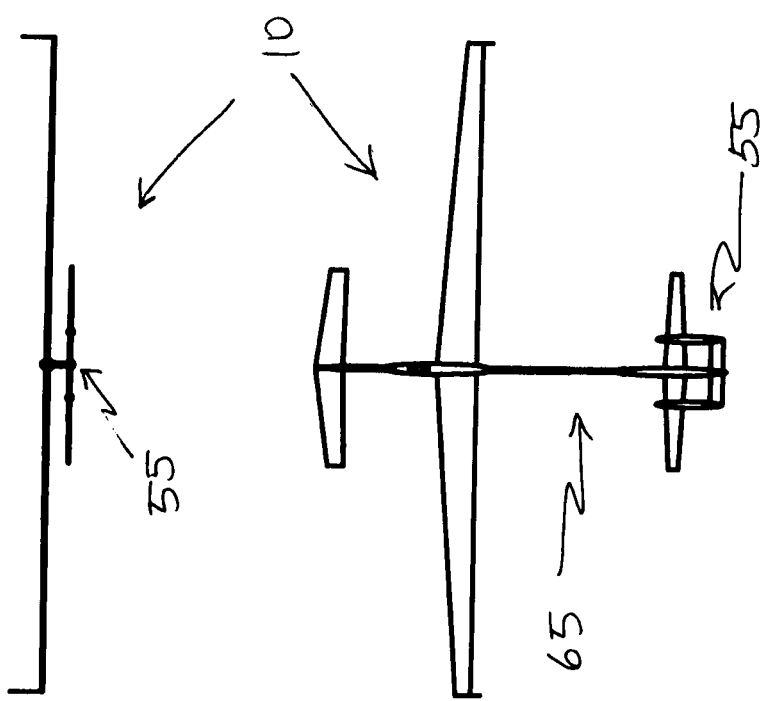
FIG. 8(a)
FIG. 8(d)
FIG. 8(b)
FIG. 8(c)

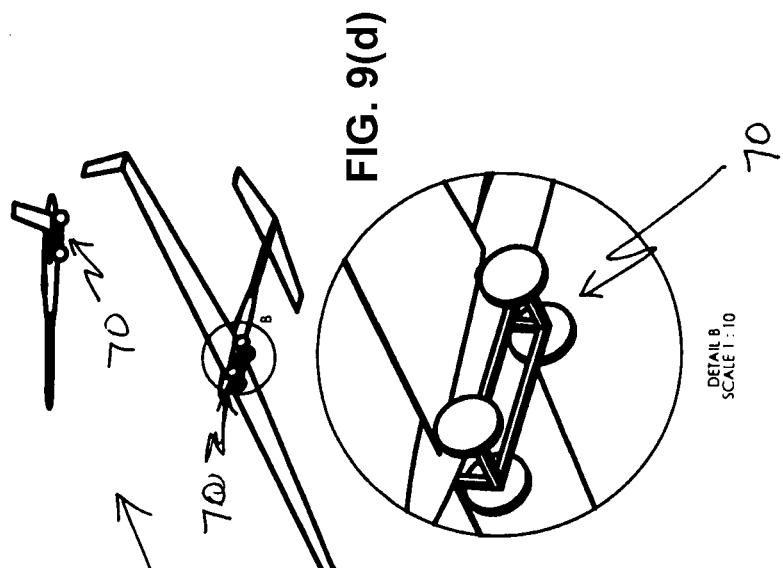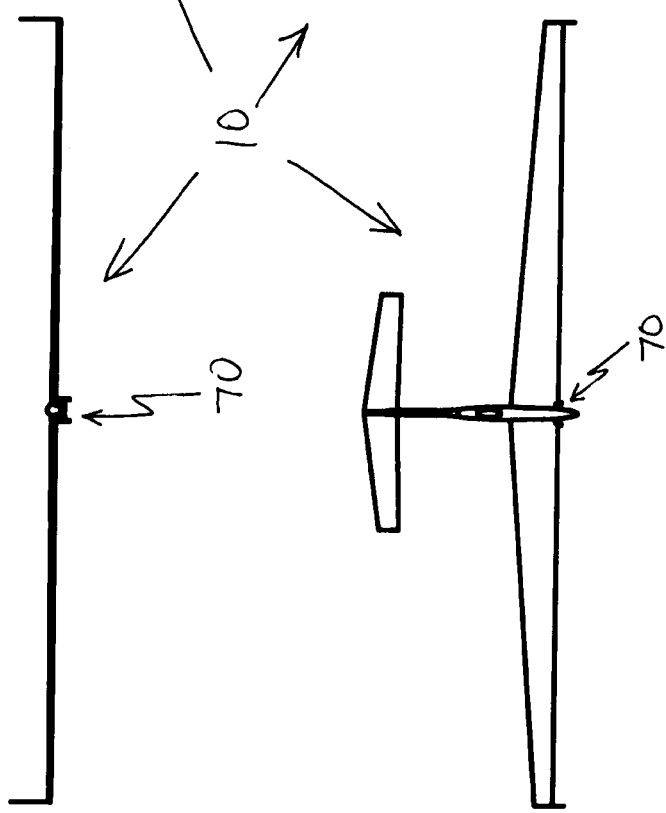

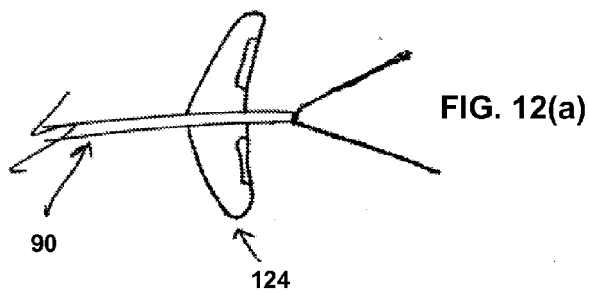
FIG. 12(a)
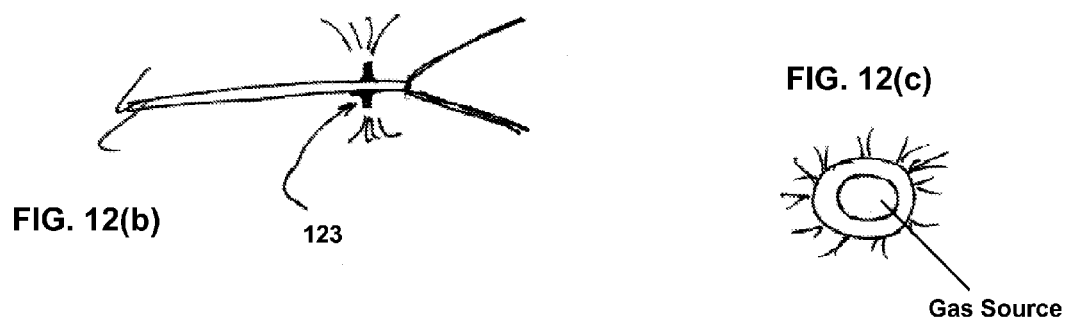
FIG. 12(b)
FIG. 12(c)
Gas Source
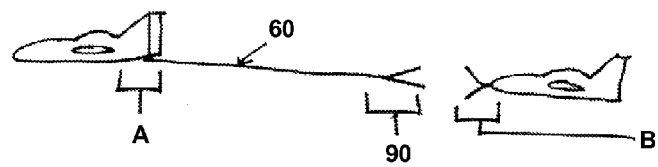
FIG. 13

FIG. 14(a)
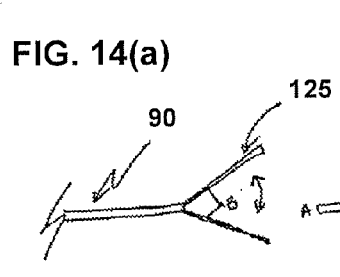
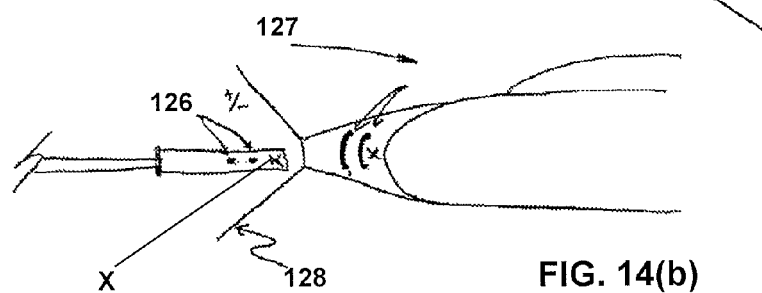
Top View
Side View
FIG. 14(b)

FIG. 15
FIG. 16(a)
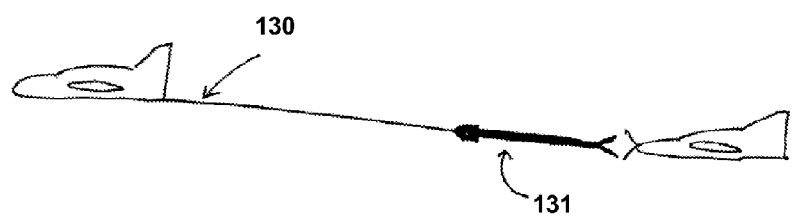
FIG. 16(b)
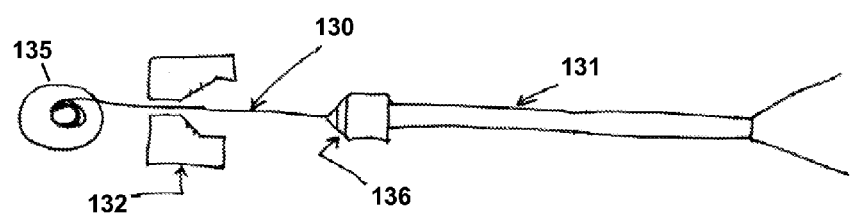
FIG. 16(c)

LONG RANGE ELECTRIC AIRCRAFT AND METHOD OF OPERATING SAME

This application is a continuation in part of U.S. application Ser. No. 13/852,315, filed Mar. 28, 2013, which claims priority to U.S. Provisional Patent Application Ser. No. 61/618,482 filed Mar. 30, 2012, this application also claims the benefit of U.S. Provisional Patent Application Ser. No. 62/064,366, filed Oct. 15, 2014, all three previous applications are herein incorporated by reference in their entirety.

FIELD OF THE INVENTION

The present invention relates to aircraft that operate on electric power. More specifically, the present invention relates to electric aircraft, and methods of operating electric aircraft that have long range capabilities. The present invention further provides a method and system to recharge or refuel an aircraft while in flight.

BACKGROUND OF THE INVENTION

Electric aircraft have significant advantages over fossil-fuel powered conventional aircraft. For example, electric aircraft can achieve the same horsepower at any altitude, whereas fossil-fuel powered aircraft lose substantial power at higher altitudes due to low oxygen levels. Electric aircraft are capable of generating instantaneous torque at low RPM. Still further, electric aircraft have zero emissions, a low noise output, and low heat generation, all of which are particularly advantageous in military applications, where low noise and heat levels in particular enhance the stealthy characteristics of the aircraft, thus allowing the aircraft to more effectively avoid enemy detection and attack.

Civilian and commercial operators also benefit from the advantages associated with electric aircraft. For example, electric aircraft are upwards of 90 percent efficient, compared to fossil-fuel powered aircraft which are roughly 35 percent efficient. Thus, electric aircraft may be less expensive to operate than fossil-fuel powered aircraft, especially in light of the ever increasing cost of fossil fuels. As stated above, electric aircraft have zero emissions and a low noise output. Electric aircraft are, therefore, environmentally friendly. This alone has the potential of opening up new flight operation opportunities in noise abatement zones and environmentally protected areas as well as complying with future pollution and emissions mandates.

Of course, there are drawbacks associated with electric aircraft, particularly electric aircraft that operate on battery power. The primary drawback is range. An electric aircraft operating on battery power is severely limited in range, that is, the distance an aircraft can travel without having to land and refuel, or recharge in the case of electric aircraft. This problem is primarily due to limitations associated with the current state of battery technology.

Current state of the art batteries have very low energy densities compared to, for example, gasoline. Indeed, the large energy density gap between fossil fuels and batteries is impeding the widespread adoption of electric vehicles, including electric aircraft. Present state of the art electric aircraft are barely able to achieve ranges of 200-300 miles before having to land for a long period of time to recharge the onboard battery.

Mid-air refueling of gasoline powered airplanes is known in the art but requires high precision flight and typically involves the pilot of a plane to be refueled to carefully maneuver into position behind a tanker refueling plane in order to perform the high precision operation of inserting a small, round probe into a moving basket drogue chute "probe-and-drogue" or through the similarly difficult method known as "flying boom". Disturbances in the air from turbulence and wake vortices from the tanker plane make the accurate connection of the probe and drogue a difficult, time-consuming and potentially dangerous operation that has proven impossible to automate. Despite being reduced to practice in the 1940's, mid-air refueling operations of today still require highly skilled pilots and recharging operators for these operations which are still more "art" than "science".

From 2010 to 2012, DARPA spent $33M in project KQ-X awarded to Northrop Grumman in an unsuccessful attempt to have one NASA Global Hawk refuel a second NASA Global Hawk flying at high altitude in close formation. The two UAVs flew within 100 feet of each other but were unable to connect and transfer fuel and the program was cancelled.

Companies such as Amazon, Google, FedEx, UPS and DHL are expressing interest in utilizing fleets of drones to deliver packages to consumers as well as for agricultural, law enforcement, film and television and many other applications that would benefit from a substantial increase in flight duration and payload. The U.S. Military is interested in persistent aerial platforms to carry sensors and other payloads in hostile environments where electric aircraft more easily avoid enemy detection due to reduced noise and heat signatures. Companies providing internet services including stakeholders such as Facebook and Google are interested in persistent aerial platforms to provide internet services over regions currently without such services.

Efforts have been made to extend the range of electric aircraft without returning them to their base of operations such as through inductive recharging on static power lines as found in U.S. Pat. No. 7,714,536, which is hereby incorporated by reference. This is not a desirable option for extending the range of electric aircraft because the permanent location of existing power lines severely restricts the operational area of the aircraft, permissions are required from the owners and operators of such power lines, and the extremely high voltage and proximity to neighborhoods creates a safety risk of trying to land remotely piloted aircraft on them. Additionally, since the power lines are fixed and the electric aircraft requiring recharge are moving, complicated latching mechanisms are needed, which add weight and complexity, especially for fixed wing aircraft, which cannot slow down or hover like rotorcraft to effect a consistently reliable attachment to the high-power utility lines.

To increase the flight duration of electric airplanes, the inventors of the present invention created a mid-air recharging technology for electric airplanes based on an improved probe-and-drogue as well as flying boom recharging apparatus entitled "LONG RANGE ELECTRIC AIRPLANE AND METHOD OF OPERATING SAME", filed as PCT/US2013/034420 and published as WO 2014/011255 A2, which is hereby incorporated by reference. One embodiment of this invention is for a UAV to act as the recharging plane and/or the plane receiving the recharge, thereby removing human pilots and/or recharging operators from the process. To accomplish this level of automation, a new approach is needed to establish and maintain the electrical connection between two or more aircraft flying in close formation.

Accordingly, what is needed is a method and apparatus of establishing and maintaining a mid-air connection between one or more manned or unmanned electric airplanes requiring a recharge or supplementation of the on-board energy source from a manned or unmanned recharging airplane that is easier, faster, safer and precisely repeatable with automation than current probe and drogue and boom connection techniques known in the art.

SUMMARY OF THE INVENTION

The present invention obviates the aforementioned drawbacks and deficiencies associated with conventional electric aircraft due to limitations in range caused by the low energy densities of even the best state of the art batteries.

One aspect of the present invention is the ability to meet or exceed the range performance of gasoline or jet fuel aircraft and, therefore, eliminate "range anxiety," by employing one or more batteries that, in-flight, are can either be recharged or replaced.

Exemplary embodiments employ batteries that are configured to fly, independent of the electric aircraft, for example, in the form of an unmanned aerial vehicle (UAV), as well as rendezvous with and dock with the electric aircraft in order to replace charge depleted batteries, including charge depleted batteries that have been jettisoned or otherwise separated from the aircraft, or in the alternative, connect with the electric aircraft and perform in-flight recharging.

It will be understood that the batteries may be jettisoned, in-flight, if and when it is determined that the electric charge falls below a predefined threshold other than total electric charge depletion, as there may be situations where it is more efficient to jettison a battery before all of the electric charge is depleted. However, for ease of discussion purposes only, the present specification will use electric charge depletion as the threshold.

One objective of the present invention is to provide an electric aircraft capable of flying greater ranges than conventional electric and/or fossil fuel powered aircraft.

Still another objective of the present invention is provide an environmentally friendly electric aircraft that is attractive to customers and consumers, so that environmentally friendly electric aircraft are more widely employed, thereby reducing dependence on fossil fuel powered aircraft.

Thus, in accordance with one aspect of the present invention, the above-identified and other objectives are achieved by employing an apparatus for transferring electricity between at least two aircrafts during flight including a deployable towing cable comprising a first portion and a second portion, the deployable towing cable being attached to a first aircraft, an electrical connection between the first portion of the cable and a source of electricity on the first aircraft, a mechanism for connecting the cable to a second aircraft at the second portion of the cable, wherein the mechanism for connecting the cable to the second aircraft is designed to also provide an electrical connection between the first aircraft and the second aircraft, and wherein when the cable is connected to the second aircraft, the first aircraft at least partially tows the second aircraft while electricity is transferred between the first aircraft and the second aircraft.

In accordance with another aspect of the present invention, the above-identified and other objectives are achieved by an apparatus for regenerating electricity in at least one flying aircraft wherein a deployable cable depending from a first aircraft, the upstream end of the cable providing a mechanical connection to a reeling device onboard the first aircraft, the downstream end of the cable providing a mechanism for connecting to a second aircraft having at least one propeller and an energy storage medium, a receiving device depending from the second aircraft providing a reciprocal mechanism for receiving the connection mechanism of the cable, wherein the first aircraft tows the second aircraft after the connection is made and the second aircraft uses the windmilling action of its at least one propeller to regenerate electricity for its onboard energy storage medium.

In accordance with still another aspect of the present invention, the above-identified and other objectives are achieved by an apparatus for replenishing the energy source in at least one flying aircraft wherein a deployable refueling conduit depending from a first aircraft, the upstream end of the conduit providing a mechanical connection to a reeling device onboard the first aircraft, the downstream end of the conduit providing a mechanism for connecting to a second aircraft having provisions for energy storage, a receiving device depending from the second aircraft providing a mechanism for receiving the connection mechanism of the conduit, a thruster mechanism located at the downstream end of the conduit, capable of providing thrust in at least one direction, wherein the thruster mechanism is actuated in order to adjust the position of the downstream end of the conduit to facilitate connection to the second aircraft.

In accordance with yet another aspect of the present invention, a system of delivering multiple secondary aircrafts by transporting the secondary aircrafts using a primary aircraft, jettisoning the secondary aircrafts from the primary aircraft, and docking the secondary aircrafts back with a primary aircraft.

In accordance with still another aspect of the present invention, the above-identified and other objectives are achieved by a method for regenerating electricity in at least one flying aircraft including deploying a cable from a first aircraft using a reeling device, the cable having an upstream end connected to the reeling device and a downstream end. Connecting the downstream end of the cable to a second aircraft, wherein the second aircraft comprises at least one propeller and an energy storage medium and wherein the first aircraft tows the second aircraft after the connection is made. Regenerating electricity for the energy storage medium on the second aircraft using a windmilling action of the at least one propeller.

In accordance with another aspect of the present invention, the above-identified and other objectives are achieved by a system for regenerating electricity in at least one flying aircraft having a deployable cable connected to a first aircraft, the cable comprising an upstream end and a downstream end, the upstream end of the cable comprising a mechanical connection to a reeling device onboard the first aircraft, the downstream end of the cable comprising a mechanism for connecting to a second aircraft having at least one Ram Air Turbine ("RAT") and an energy storage medium and a reciprocal mechanism connected to the second aircraft for receiving the connection mechanism of the cable. Wherein the cable is designed to allow the first aircraft to tow the second aircraft when it is connected to the second aircraft and wherein the RAT is designed to regenerate energy for the energy storage medium when the second aircraft is being towed.

BRIEF DESCRIPTION OF THE DRAWINGS

Several figures are provided herein to further the explanation of the present invention. More specifically:

FIGS. 1(a)-1(d) illustrate an exemplary configuration, in accordance with a first exemplary embodiment of the present invention, where one or more battery packs are internally located with respect to the mothership;

FIGS. 2(a)-2(d) illustrate an exemplary configuration, in accordance with a first exemplary embodiment of the present invention, where one or more battery packs are located in pods which are, in turn, externally located with respect to the mothership;

FIGS. 3(a)-3(d) illustrate another exemplary configuration, in accordance with a first exemplary embodiment of the present invention, where one or more battery packs are located in pods which are, in turn, externally located with respect to the mothership;

FIGS. 4(a)-4(d) illustrate a single UAV pack connected to the vertical stabilizer of a mothership, in accordance with another exemplary embodiment of the present invention;

FIGS. 6(a)-6(d) illustrate each of two UAV packs connected to the tip of a corresponding one of the main wings of a mothership, in accordance with another exemplary embodiment of the present invention;

FIGS. 7(a)-7(d) illustrate a UAV pack connected to the mothership through an extendible cable, in accordance with yet another exemplary embodiment of the present invention;

FIGS. 8(a)-8(d) illustrates a UAV pack connected to the mothership through an extendible boom, in accordance with yet another exemplary embodiment of the present invention;

FIGS. 9(a)-9(d) illustrates a mothership connected to a takeoff cart, in accordance with another aspect of the present invention;

FIGS. 12(a)-12(c) illustrate exemplary flight control apparatuses for a deployable cable that may be used to connect a first aircraft to a second aircraft, in accordance with aspects of the present invention.

FIG. 13 illustrates exemplary arrangement of a first aircraft and second aircraft when connected via a cable, in accordance with aspects of the present invention.

FIGS. 14(a)-14(b) illustrate exemplary embodiments of recharging connection mechanisms, in accordance with aspects of the present inventions.

FIG. 15 illustrates exemplary embodiments of an arrangement wherein a first aircraft tows a second aircraft wherein the second aircraft regenerates energy, in accordance with aspects of the present invention.

FIGS. 16(a)-16(c) illustrates exemplary embodiments of a towing cable having a first towing portion and a second towing and recharging portion, in accordance with aspects of the present invention.

DETAILED DESCRIPTION

Figure 5A:
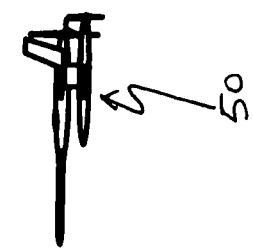
FIGS. 5(a)-5(d) illustrate two UAV packs connected under the fuselage of the mothership, in accordance with another exemplary embodiment of the present invention.
Figure 5D:
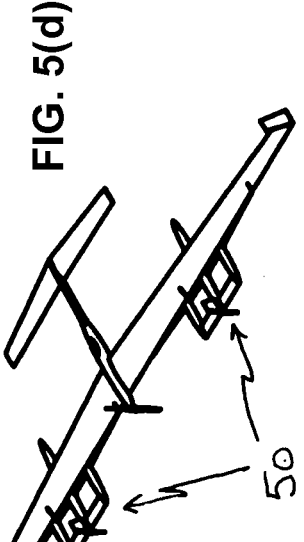
Figure 5B:
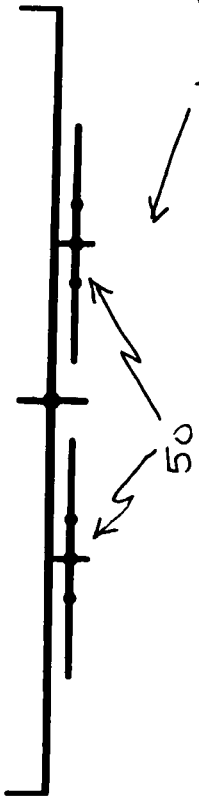
Figure 5C:
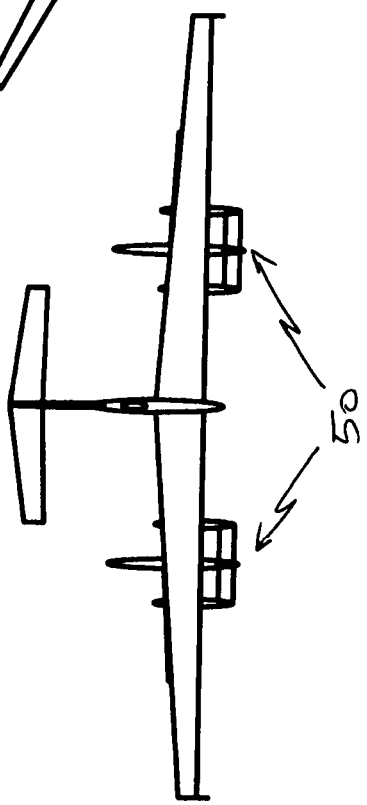

It is to be understood that both the foregoing general description and the following detailed description are exemplary. As such, the descriptions herein are not intended to limit the scope of the present invention. Instead, the scope of the present invention is governed by the scope of the appended claims.

The present invention covers electric aircraft, hybrid-electric aircraft, fuel aircraft and methods of operating either fuel aircrafts or electric and hybrid-electric aircraft that employ one or more batteries. The present invention also covers electric and hybrid aircrafts and methods of operating electric or hybrid aircraft that employ one or more batteries that may be configured to fly, independent of the electric or hybrid aircrafts, and thus have the capability to take off, rendezvous with and dock with the electric or hybrid aircrafts. The present invention further covers method of connecting a first aircraft to a second aircraft for the purpose of transferring electrical energy and/or fuel, to transfer a battery pack from one aircraft to the other, or to dock one aircraft to the other. In accordance with at least one exemplary embodiment below, batteries configured to fly, independent of the electric aircraft, may be employed to replace charge depleted batteries, including charge depleted batteries that have been jettisoned or otherwise separated from the electric aircraft.

Although it will be apparent from the detailed description below, the general principles of the present invention are not limited to battery powered electric aircraft and methods of operating such battery powered electric aircraft. In fact, the general technical principles of the present invention as set forth herein below can be applied to aircraft employing energy sources such as solar, fuel cells and hybrid electric aircraft that may also include an internal combustion or turbine power plant or generator on board. Moreover, the method of connecting a first aircraft to a second aircraft may equally be applicable to electrical, hybrid, as well as fuel aircraft. For the purposes of this disclosure, the term "electric aircraft" shall be taken to include aircraft that have at least one battery and at least one electric motor as any portion of their propulsion design, such as all-electric, hybrid-electric (including internal combustion and turbines), solar, fuel cell and other forms of electrically powering an electric motor. Nevertheless, the detailed description presented below focuses on electric aircraft and methods of operating electric aircraft.

With respect to aircraft that are wholly or at least partially powered by electrical energy, exemplary embodiments include the use of one or more battery packs. The aircraft may be designed to include one battery pack. In an alternative embodiment, the aircraft may be designed to hold multiple battery packs. In exemplary embodiments having multiple battery packs, the various battery packs may either be all the same or different. In an exemplary embodiment the aircraft may be equipped with one or more primary battery packs and one or more secondary battery packs. The primary and secondary battery packs may be the same or of different sizes.

In a first exemplary embodiment an aircraft may be designed to drop depleted battery packs while in-flight. In exemplary embodiments the battery packs may take the form of air vehicles. In exemplary embodiments the battery packs may be unmanned aerial vehicle (UAV). Moreover, upon discard of the depleted battery packs, the aircraft may either continue flying powered by either fuel and/or remaining battery packs. In exemplary embodiments, the aircraft may also be designed to receive new battery packs to replace the discarded depleted battery packs. In an alternative embodiment, one or more battery packs are not discarded once depleted, instead they are recharged. As described in more detailed below, embodiments describing the recharge of depleted battery packs may equally be applicable to transfer fuel to non-electric aircrafts and/or hybrid aircrafts. It is also within the scope of the present invention to have a combination of these embodiments. In other words, the battery packs may be UAVs whether or not they are discarded. Also, the battery packs may be UAVs and able to be recharged during flight either on their own or while docked with an aircraft. Finally, as stated previously the description herein focused on the operation of an electrical aircraft is equally applicable to hybrid aircrafts that may use fuel in addition to electrical power.

For ease of discussion, and to more clearly distinguish between a first aircraft and a second aircraft, wherein, for example, the second aircraft is the aircraft that provides energy and/or fuel to the first aircraft, the first aircraft will be referred to as "mothership" and the second aircraft will be referred to as "charging aircraft." It should be noted that the terms "first aircraft" and "second aircraft" as used herein are intended in their broadest meaning and to be interchangeable. The mothership may be an electrical, hybrid, or fuel aircraft. The mothership may be a UAV or a manned aircraft. For the purposes of this discussion, the mothership is described as an electrical aircraft. However, as pointed out throughout the discussion some of the systems and methods described herein are equally applicable for transfer of fuel that could be used in fuel or hybrid aircrafts. The charging aircraft may be a manned aircraft or a UAV. The charging aircraft may also be an electric, hybrid or fuel aircraft. In exemplary embodiments, the charging aircraft may itself be a UAV battery pack. In these latter exemplary embodiments, the charging aircraft may be referred to as the UAV pack.

In a first exemplary embodiment, the mothership employs one or more battery packs that separate and drop away from the mothership, while the mothership is in-flight, when the electric charge associated with each of the one or more battery packs is depleted. In one exemplary embodiment, the mothership may then continue its journey powered by either the remaining battery packs or, if available, fuel. By releasing the one or more battery packs, the range of the mothership may be significantly extended. As one skilled in the art will readily appreciate, aircraft range is highly dependent on the gross weight of the aircraft. Thus, shedding the weight of the one or more battery packs, while the mothership is in-flight, will allow the mothership to fly more efficiently, that is, to fly greater distances on the same amount of electric charge. An analysis that demonstrates how range is significantly improved by shedding weight in-flight, and how range is even further improved if the shedding of weight is broken up into multiple events over the course of the flight has already been provided in U.S. application Ser. No. 13/852,315 which is hereby incorporated by reference in its entirety. In an alternative embodiment, the depleted battery packs may be replaced once depleted. For example, one the battery packs have separated from the mothership, new battery packs may be provided to the mothership.

One or more battery packs may be located on the interior or the exterior of the mothership, as illustrated by the exemplary configurations of FIGS. 1(a)-3(d). In each of these figures, a mothership 10 is depicted along its pitch (a), roll (b) and yaw (c) axes. Additionally, each of these figures provides a perspective view (d), further illustrating either an internal or an external configuration for the one or more battery packs. More specifically, in FIGS. 1(a)-3(d), mothership 10 has a fuselage 15, main wings 20, forward wings (also known as a Canard wing) 25 and a vertical stabilizer 30. As shown, each of the main wings 20 comprises a wingtip device 35. These are typically provided to increase the efficiency of the aircraft by smoothing the airflow over the upper surface of the wing near the wingtip, thereby reducing lift-induced drag caused by wingtip vortices and increasing fuel efficiency and range, as is well known in the art. As increased efficiency and range are objectives of the present invention, mothership 10 is illustrated with wingtip devices 35, although it will be understood that such devices are optional.

FIGS. 1(a)-(d) illustrates an exemplary configuration, where the one or more battery packs are internal to mothership 10. In this exemplary configuration, mothership 10 includes one or more doors 40 associated with the underside of fuselage 15, as illustrated in FIG. 1(d). The one or more doors 40 open to a bay or compartment in fuselage 15. In this exemplary configuration, the one or more battery packs are discreetly located inside the bay or compartment. When the mothership 10 determines that the charge associated with a first one of the one or more battery packs is depleted, the mothership 10 opens the doors 40, thereby exposing the bay or compartment where the one or more battery packs are located. The mothership 10 then disconnects the charge depleted battery pack electrically as well as mechanically, and jettisons the battery pack so that it drops out of the bay or compartment and away from the mothership 10. It will be understood that this sequence may be repeated as the charge associated with each of the remaining battery packs becomes depleted. It should be further noted that in accordance with a preferred embodiment, the disconnection and subsequent jettison of each battery pack should not result in any net force about the roll axis as the battery packs are located along the centerline of the mothership 10. Each jettison of a charge depleted battery pack could, however, cause a change in the center of gravity (CG) of the mothership 10, which can be compensated for by a coordinated movement of any remaining battery packs to center their remaining mass at the desirable CG point for the aircraft. Alternately, the mothership 10 may be required to make trim adjustments to its flight control surfaces to account for the change in CG in order to maintain level flight, as one skilled in the art will readily appreciate.

Each battery pack will be connected to the mothership, electrically as well as mechanically, inside the bay or compartment, as mentioned above. The mechanism that is employed to secure and subsequently jettison each battery pack may involve any of a number of design configurations.

In one embodiment, the battery packs are mounted along a rail system in a collinear arrangement. The rails may be round and conductive so as to provide at least three desirable features: (i) securing the battery packs inside the aircraft, (ii) allowing the battery packs to be slidably engaged and moved linearly along the rail system during jettison and rebalancing operations, and (iii) to serve as electrical conductors to convey electrical power from the battery packs mounted thereto, to the electric motor control system of the aircraft.

Figure 10:
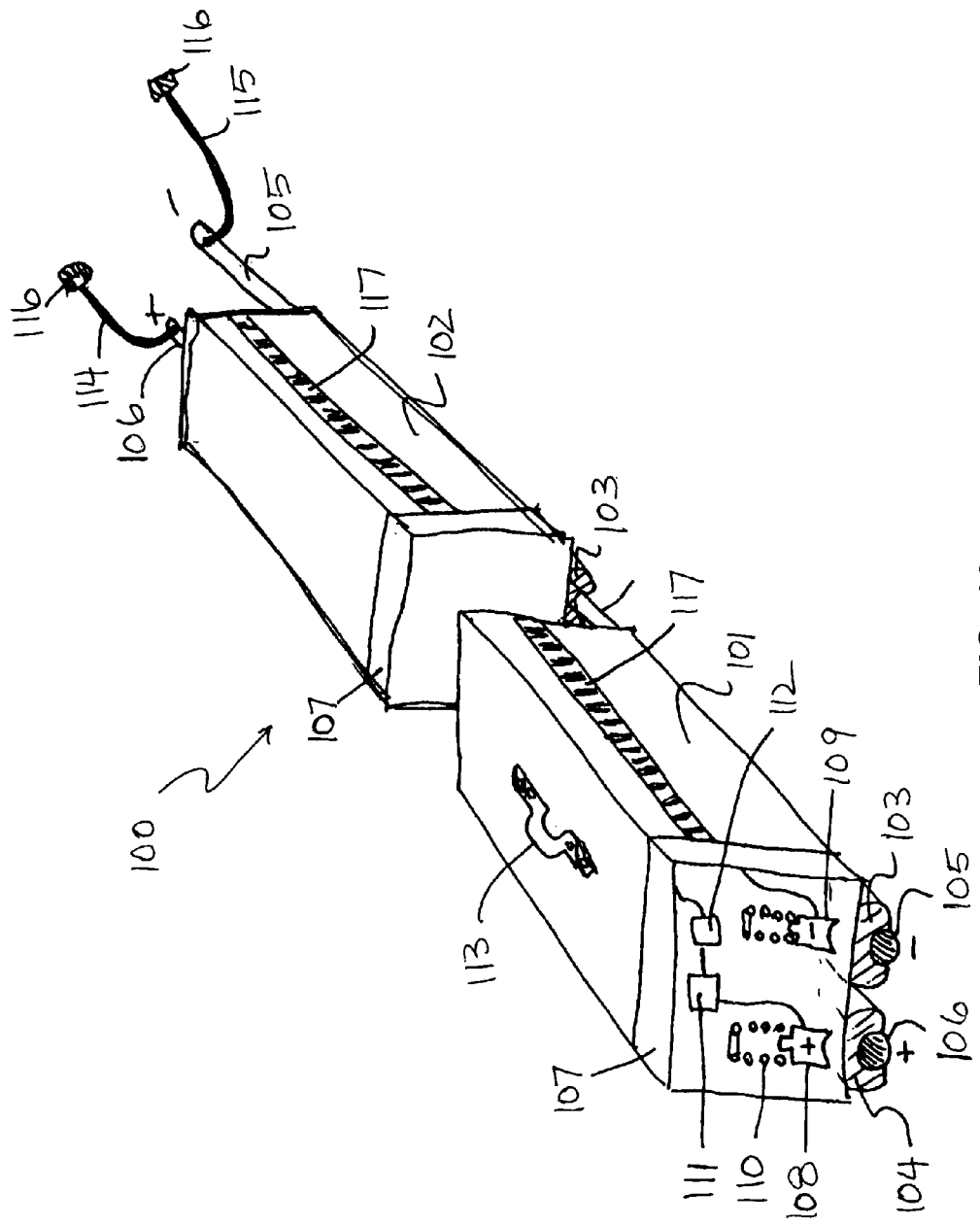
FIG. 10 illustrates a battery pack securing mechanism in accordance with a preferred embodiment of the present invention.

FIG. 10 illustrates an exemplary battery mounting linear sliding rail system 100 with provisions for the shuttling and jettisoning of battery packs. For purposes of illustration, two complete battery packs 101 and 102 are shown, slidably engaged to the linear sliding rail system 100. Battery pack 101 and battery pack 102 are comprised of a plurality of interconnected batteries such as lithium-ion polymer batteries (not shown) and feature linear sliding bearings 103 and bearings 104 on the underside, known to those skilled in the art as linear pillow block bearings. Bearings 103 and 104 are slidably engaged to rails 105 and 106, which are preferably constructed of an electrically conductive material to convey electrical power from the battery packs to the electric motor control system, and more generally, the mothership's propulsion system.

Attached to the front of battery pack 101 and the front of battery pack 102 is an integral battery management system (BMS) area 107 which houses ancillary electronics necessary and desirable for the functionality of battery packs 101 and 102. Inside BMS area 107 are electrical brushes 108 and 109. Each of the electrical brushes 108 and 109 feature one end having a semi-round concave shape to matably engage rails 106 and 105, respectively, through an opening in the bottom of BMS area 107 (not shown). Brushes 108 and 109 are forced into contact with rails 106 and 105 by a spring 110, as is known to those skilled in the art of electric motor brushes and electrical power transmission. Brushes 108 and 109 are made from a conductive material such as carbon and are electrically connected to the positive and to the negative terminals of the battery packs 101 and 102. Alternately, brushes 108 and 109 may be constructed from other conductive materials such as copper, may be integral to bearings 103 and 104, and may or may not be spring loaded. For ease of illustration, FIG. 10 shows the brushes 108 and 109 slightly retracted and hovering above rails 106 and 105, though in operation, it is to be understood that they would be in contact and slidably engaged with rails 106 and 105. The semi-round concave shape of the brushes may be other shapes so long as they are dimensionally similar to the corresponding mating shape of rails 106 and 105. Electrical continuity (i.e., between the battery pack and the mothership's propulsion system) may be selectably enabled by the user or by an automated system via known means in the art such as by an electrical contactor 111. For safety purposes, a fuse 112 may also be installed in either or both of the positive and negative electrical paths. Also inside BMS area 107 is a battery management system (not shown) that includes provisions for individually monitoring the voltage of each individual battery cell inside the battery pack (not shown).

In certain embodiments where battery packs are not intended to be connected electrically in parallel, it is preferable not to have more than one battery pack completely electrically connected to linear slides 105 and 106 because different battery packs at different states of charge (SOC) should not generally be connected together in parallel without prior accommodations and precautions being taken. In a preferred embodiment, the battery packs are not connected together electrically in parallel so that the aircraft is running on one battery pack at a time, which becomes depleted and ready for jettisoning more immediately than if multiple battery packs are connected in parallel and depleted as a larger capacity group more slowly. The benefit to depleting smaller packs more quickly is that the weight of the depleted packs may be jettisoned more immediately and more frequently during a route of flight, resulting in a longer flight range due to reduced airframe mass. Accordingly, contactor 111 is inserted into the positive electrical path, as shown in FIG. 10, in order to interrupt the electrical connection when battery pack 101 is designated as "offline" prior to use or just after use. The negative side may remain connected to the rail 105 without the use of a contactor because electricity will not flow from the battery pack 101 if the contactor 111 is in the open position, however, a negative leg contactor may be used. When the battery pack 101 is ready to be placed online in order to provide electric charge for the mothership's propulsion system, a user or the aircraft battery control software will command the contactor 111 to close, and power from the battery pack 101 will flow through the brushes 108 and 109, onto the rails 106 and 105, and via electrical cables or other appropriate conduits 114 and 115 to be connected to the mothership's propulsion system via optional connectors 116.

Further in accordance with the embodiment illustrated in FIG. 10, the battery mounting linear sliding rail system 100 is activated in response to a command signal provided by the mothership, upon determining that the electric charge associated with a given one of the battery packs has been depleted, so as to first electrically disconnect the battery pack by opening the contactor 11 and then jettison the charge depleted battery pack, thus allowing the battery pack to drop away from the mothership as described above. A secure mounting point 113 can be used to attach a parachute or other like device to assist with the jettison operation. A linear gear rack 117, known to those skilled in the art of motion control, can be attached to one or more sides of the battery packs 101 and 102 for the purpose of engaging a motor driven round gear (not shown) that will move battery packs 101 and 102 forward and/or backward linearly along rails 105 and 106 for the purposes of jettisoning or repositioning remaining battery packs for optimum aircraft center of gravity trim balance as part of an onboard Jettison and Balance System (JBS).

The JBS includes an indication of aircraft pitch such as from an onboard Attitude Heading and Reference System (AHRS) as well as information from the onboard Aircraft Control Software (ACS) such as battery pack State of Charge (SOC), flight information, pilot control stick inputs, location of the next jettison drop, aircraft weight and balance and other such information to inform the jettison timing and movement of remaining battery packs onboard the aircraft. The ACS manages the battery packs and jettisoning system. The ACS is in electrical communication with each of the battery packs, the JBS, the flight controls, and the navigation information for the route of flight. Using these and other inputs, the ACS determines when a battery pack has become depleted and sends a signal to the depleted battery pack to open its contactor 111 thereby electrically isolating it from the rail 106. The ACS then sends a signal to the next fully charged battery pack in line to close its contactor 111 thereby allowing the battery pack voltage to become available on rail 106 to provide electrical power for the mothership's propulsion system. To avoid electrical surges or spikes during the transition period of isolating a depleted battery pack and connecting a freshly charged battery pack, it may be desirable to use a circuit containing a resistor to prevent a fast inrush of current from the fresh battery pack to the electric motor controller. Such circuits are known to those skilled in the art of electric motor controllers as "Soft-Start Circuits". Other techniques such as using a capacitor or other battery pack to hold the voltage to the electric motor constant, and prevent loss of power to the propeller during changeover periods may be used. Concurrently, the ACS also compares the aircraft's present position and route of flight to determine if and when the recently depleted battery pack should be jettisoned. When the ACS determines that a jettison operation should occur, it sends a signal to the JBS, which opens a hatch if so equipped, operates the motor driven round gear (not shown) to linearly slide and then jettison the depleted battery pack out of the aircraft while simultaneously repositioning the remaining battery packs along rails 105 and 106 to rebalance the aircraft as desired. It is to be understood that the functionality of the JBS, ACS and AHRS, which is separately explained herein for clarity, may be combined into a single piece of hardware and/or software by a person practicing the present invention. During the jettison process, a parachute may be employed that is pre-connected to each battery pack or that is connected just prior to the jettisoning action. The parachute may be triggered by a ripcord attached to the mothership or by a timed deployment device integral to the parachute, or by other such means as are known to those skilled in the art of cargo parachuting operations. One source of such cargo aerial delivery parachutes is Airborne Systems of North America.

FIGS. 2(a)-3(d) illustrate exemplary configurations, where the one or more battery packs are located externally with respect to mothership 10. More specifically, in each of these exemplary configurations, the one or more battery packs are located in pods 45, suspended from or otherwise attached to mothership 10.

In FIGS. 2(a)-(d), the one or more pods 45 are suspended from the underside of the fuselage 15. As shown, this exemplary configuration reflects an inline arrangement. Thus, as the electric charge associated with a first battery pack is depleted, a door or doors (not shown) associated with the corresponding pod 45 open, and the charge depleted battery pack is disconnected, electrically and mechanically, and then jettisoned so that it can drop away from the mothership 10, in the same or similar manner described above with respect to the exemplary configuration illustrated in FIGS. 1(a)-(d). Again, this process may be repeated as the charge associated with each of the remaining battery packs becomes depleted. Alternatively, each pod 45 may be disconnected, electrically and mechanically, and jettisoned so that it may drop away from the mother ship 10 when all of the battery packs located therein are depleted of charge.

In the case where the entire pod is configured to be jettisoned, it may be desirable to connect any battery packs internal to the pod together as one essentially large battery pack. The reason being, is that the pod is not likely to be jettisoned until all of the battery packs internal to the pod are depleted of electric charge. Thus, in this instance, it may be less advantageous to have a plurality of sequentially utilized battery packs inside the pod It should be noted that this inline arrangement may be beneficial in that the disconnection and subsequent jettison of each battery pack or pod 45 should not cause any net force about the roll axis as the battery packs and pods are located along the centerline of the mothership 10. However, as explained above, each jettison of a charge depleted battery pack or the jettison of a pod 45 could potentially cause a change in the CG of the mothership 10. Thus, the mothership 10 might may be required to either reposition the remaining battery packs with the rail mounting system described above, reposition the remaining pod or pods forward or backward along a rail mounting system similar to that described above, or make trim adjustments to account for changes in CG in order to maintain level flight.

In FIGS. 3(a)-(d), one or more pods 45 are suspended from the underside of each main wing 20. In this exemplary configuration, the pods 45 are positioned symmetrically, on either side of the longitudinal axis of the mothership 10, not inline along the longitudinal axis, like the exemplary embodiment illustrated in FIGS. 2(a)-(d). Accordingly, the jettison of a charge depleted battery pack or the jettison of an entire pod 45 from under one of the main wings would preferably, though not necessarily, coincide with the jettison of a charge depleted battery pack or an entire pod 45, respectively, from under the other main wing. The reason for this would be to prevent any net force about the roll axis. As stated above with respect to the exemplary embodiments illustrated in FIGS. 1(a)-2(d), the jettison of each charge depleted battery pack or the jettison of a pod 45 could potentially cause a change in the CG of the mothership 10. Thus, the mothership 10 may be required to either reposition the remaining battery packs with the rail mounting system described above, or make trim adjustments to account for changes in CG in order to maintain level flight. In the case where the entire pod is being jettisoned, it may be desirable to connect any battery packs internal to the pod together as essentially one large battery pack. Furthermore, in the case of underwing pods that are desirable to jettison as a pair to prevent any net force about the roll axis, the battery packs in both pods may be electrically wired together in parallel to form essentially one large battery pack spread across two or more underwing pods that are jettisoned simultaneously.

In the exemplary configurations of FIGS. 2(a)-3(d), mothership 10 is illustrated as having two pods 45. It will be understood, however, that the mothership 10 may have more or less than two pods 45. With specific regard to the exemplary configuration of FIG. 3, however, it is preferable, though it is not necessary, that there be an even number of pods 45, with the same number of pods 45 on both sides of the longitudinal axis, in order to maintain a symmetric configuration.

The battery packs and/or pods that are jettisoned may be discarded. However, it is preferable, and certainly more environmentally friendly, to recover and reuse the battery packs and pods. In order to recover and reuse the battery packs and pods, any number of techniques are possible. For example, each battery pack or pod may be equipped with a parachute as previously described. Additionally, dye markers or transponders may be employed to assist in locating the battery packs or pods which could be jettisoned over remote locations, such as an ocean or a desert, or over predetermined battery collection centers strategically located on the ground along popular routes of flight. Alternatively, the battery packs or pods may be equipped with a steerable parachute for controlled descent to a predetermined location for recovery and reuse via a cargo aerial delivery parachute such as those manufactured by Airborne Systems of North America.

In an exemplary embodiment, the one or more battery packs may comprise wings, for example, battery packs that take the form of a UAV. For the purpose of convenience only, these battery packs are referred to herein as UAV packs. FIGS. 4(a)-8(d) illustrate various exemplary configurations involving UAV packs.

FIGS. 4(a)-6(d) illustrate a number of exemplary configurations where a mothership 10, shown along its pitch (a), roll (b) and yaw (c) axes, and in perspective view (d), is connected to one or more UAV packs 50. In accordance with the second exemplary embodiment, the mothership 10 is capable of taking off with the one or more UAV packs 50. More specifically, FIGS. 4(a)-(d) illustrate a single UAV pack 50 connected to the vertical stabilizer 30 or other such mounting and docking structure, not necessarily a flight control surface, of the mothership 10. In FIGS. 5(a)-(d), two UAV packs 50 are connected under the mothership 10, for example, to the underside of fuselage 15. In FIGS. 6(a)-(d), each of two UAV packs 50 are connected to the tip of a corresponding one of main wings 20. It will be understood, however, that other exemplary configurations involving UAV packs are possible.

If and when the mothership 10 determines that the electric charge associated with a UAV pack 50 is depleted, the mothership 10 may disconnect the UAV pack 50, electrically and mechanically, and jettison the UAV pack 50. The UAV pack 50 would then fly or glide to a location, for example, a predetermined land or sea based location. The flying or gliding of the jettisoned UAV pack may be accomplished by a preprogrammed autopilot on board the UAV to enable such autonomous flight, or by a remote pilot sending signals via remote control located either on the ground or in the mothership. Alternatively, it is feasible for the UAV packs to actually be manned, but this is not presently desirable due to cost and safety concerns, but may be desirable at some point in the future. Sea based locations may include ships, such as aircraft carriers, or fixed locations such as oil rig type platforms. The UAV Pack 50 could then be recharged for later reuse. Airborne or even space based collection, recharging and/or launch schemes could be used at potentially greater cost, however, for the purpose of the present description, the preferred embodiment is for ground and sea based collection centers to be established and utilized.

The UAV pack 50 may or may not employ its own propulsion system, such as an electric motor and propeller. If the UAV pack 50 does employ its own propulsion system, it could fly, independently under its own power, to the land or sea based collection center after being jettisoned by the mothership 10. If the UAV pack 50 does not employ its own propulsion system, the UAV pack 50 could be controlled, as previously described, so that it glides to one of the aforementioned locations after being jettisoned.

In one embodiment, the mothership takes off with one or more UAV pack(s) and, therefore, a certain amount of electric charge to power the propulsion system of the mothership. In-flight, mothership 10 jettisons the UAV pack(s) as they are depleted of their electric charge. Releasing the UAV pack(s), one at a time, or more than one at a time, reduces the gross weight and increases the efficiency of the mothership 10, thereby increasing range, as previously explained.

If, similar to the exemplary configuration illustrated in FIGS. 3(*a*)-(*d*), more than one UAV pack is employed, such that an even number of UAV packs are symmetrically positioned relative to the roll or longitudinal axis of the mothership 10, as illustrated in FIGS. 5(*a*)-6(*d*), it is preferable, though it is not necessary that the mothership jettison the UAV packs in pairs. That is, it is preferable that the mothership jettison one UAV pack from one side of the roll or longitudinal axis, and another from the opposite side of the roll or longitudinal axis. As previously explained, releasing the UAV packs in this manner may prevent, or at least substantially reduce the likelihood of a resulting net force about the roll axis. Also, as previously explained, the jettison of one or more UAV packs may cause a change in the CG of the mothership 10, which can be compensated for by a coordinated movement of any remaining battery packs to center their remaining mass at the desirable CG point for the aircraft, or by trim adjustments in order to maintain level flight.

Further with regard to releasing a pair of UAV packs, it may actually be desirable to consume the battery packs of both UAVs at the same time so that they become depleted concurrently and are then jettisoned at the same time, as explained above. This concurrent draw down is accomplished by electrically wiring both packs together in parallel if they are each the desired full system voltage, or in series if each pack is configured as half of the desired full system voltage. However, in certain circumstances and designs, it also may be desirable to discharge the two packs sequentially and then jettison them together once both are depleted. However, in the latter case, this results in the mothership having to carry one depleted UAV pack as dead weight while the second UAV pack is consumed, which is not efficient but may be desirable in some cases. This is accomplished by consuming the UAV packs one after the other and not having them electrically connected together during use.

In a preferred embodiment, the mothership will have an onboard battery that serves as an additional energy source for the propulsion system, in addition to any releasable battery packs or UAV packs that may be employed to supplement the onboard battery. In this regard, the UAV packs may be configured and employed a number of different ways. For example, a UAV Pack may be configured such that it carries a higher voltage than the onboard battery. In this instance, the UAV pack may be used to rapidly charge the onboard battery which, as stated, serves as an additional and onboard energy source for the propulsion system. Alternately, the UAV Pack may be configured similar to the onboard battery, wherein the UAV pack may provide electricity directly to the propulsion system, essentially and/or effectively bypassing the onboard battery. In yet another alternative, the UAV Pack may be equipped with its own generation source, such as a turbine generator in place of, or in addition to, the UAV Pack's own battery. The use of a turbine generator can rapidly recharge the onboard battery pack and in certain cases, be jettisoned more rapidly than a battery-only UAV pack, thus reducing the drag and weight associated with the mothership flying a longer portion of its route while docked to a UAV pack.

Further, one of skill in the art will appreciate the fact that the wings associated with a UAV pack provide a clear benefit, even when the UAV pack is docked with the mothership. More specifically, the wings associated with a UAV pack provide additional lift to compensate for the additional weight of the corresponding UAV pack. As such, the surface area of the mothership's wings need not be increased to provide the additional lift necessary to accommodate the periodically docked UAV packs. This is important because a larger wing surface would lower the lift to drag ratio of the mothership which, in turn, decreases efficiency and range during times when no UAV packs are connected to the mothership.

In the first and second exemplary embodiments, range is extended by jettisoning or otherwise releasing one or more battery packs in-flight and one or more UAV packs in-flight, respectively. However, neither the first nor the second exemplary embodiments provide indefinite range capability. At some point, the electric charge associated with the battery packs and/or the UAV packs become depleted, thus limiting the range of the mothership. This issue is addressed by the third exemplary embodiment.

In exemplary embodiments, the electric charge associated with one or more battery packs may also be used to extend the range of the mothership. In exemplary embodiments, charged battery packs may be delivered and connected to the mothership to either supplement or replace the depleted battery packs. In exemplary embodiments, the charged battery packs may be UAV packs. In exemplary embodiments, UAV packs can takeoff from a ground or sea based location, and then rendezvous with and dock with the mothership in-flight. After the UAV pack docks with the mothership and is electrically connected, the UAV pack can be used, as described above, to rapidly recharge a battery onboard the mothership, provide electricity directly to the propulsion system of the mothership, or provide thrust for the mothership using its own propulsion system.

As previously described, the mothership may jettison a UAV pack, when it is determined that the electric charge associated with the UAV pack is depleted. After doing so, a new UAV pack that has taken off and flown to a rendezvous point with the mothership or that has been delivered to the mothership can replace the charge depleted UAV pack, in-flight. By repeatedly jettisoning or otherwise releasing charge depleted battery packs and replacing them with electrically charged battery packs, in-flight, the range of the mothership can be extended indefinitely.

From an operations perspective, it is preferable that the electric charge associated with the mothership's onboard battery never be fully depleted. In exemplary embodiments, the mothership may also be a hybrid in which case the mothership may also rely on fuel once the battery packs have been depleted. In exemplary embodiments where the mothership is a fuel aircraft, then the replenishing of the fuel preferably occurs prior to the mothership depleting all of its fuel. This would allow the mothership to continuously power the propulsion system. For example, during periods of transition after a charge depleted battery pack has been jettisoned and while a new, charged UAV pack is preparing to dock with the mothership, the mothership may rely on other onboard battery and/or fuel. To accomplish this, particularly during flight operations involving long or even indefinite range and/or duration, the replacement battery packs can be used to not only power the mothership's propulsion system, but also to recharge the mothership's onboard battery pack.

FIGS. 4(a)-6(d), as stated above, illustrate a number of exemplary configurations where a mothership 10, shown along its pitch (a), roll (b) and yaw (c) axes, and in perspective view (d), is connected to one or more UAV packs 50.

FIGS. 7(a)-8(d) illustrate two additional exemplary configurations, where a mothership 10, shown along its pitch (a), roll (b) and yaw (c) axes, and in perspective view (d), is connected to a second aircraft ("charging aircraft") 55 that can provide electrical energy and/or fuel to the mothership. The charging aircraft may be designed to take off from a ground or sea based location and fly to a rendezvous point and dock with the mothership 10 in order to provide electric charge and/or fuel to the mothership 10. It should be understood that the term "charging aircraft" as used herein may be either a UAV or a man operated aircraft. Also, the charging aircraft may be any aircraft able to provide electrical energy, a battery pack, and/or fuel. In one embodiment the charging aircraft provides electrical energy to replenish depleted batteries on the mothership. In another embodiment the charging aircraft is capable of providing fuel to the mothership. In yet another embodiment, the charging aircraft may provide one or more battery packs to the mothership. The charging aircraft may itself be a battery pack, for example it may be a UAV pack. The charging aircraft may be an electric aircraft but is not so limited.

In order to transfer charge and/or fuel to the mothership, it should be understood that in an exemplary embodiment the charging aircraft and mothership will get close to allow a connection between them to be made such as by cable 60, lock down the connection, and then optionally arrange so that one aircraft tows the other. In this manner cable 60 can tow one of the aircrafts while at the same time function as a deployable refueling conduit. In alternative exemplary embodiments, cable connection using cable 60 may also be used to transfer battery packs from the charging aircraft to the mothership. Similar cable connection may be used to transfer depleted battery packs from the mothership to the charging aircraft. Moreover, cable connection may be employed to aid the docking of a UAV pack to the mothership.

In an exemplary embodiment shown in FIGS. 7(a)-(d), a charged UAV pack connects to the mothership 10 through a deployable cable 60. The mothership 10 may have the capability to reel in the cable after a charge depleted battery pack is jettisoned, and reel the cable out upon the arrival of a replacement charged UAV pack. Alternatively, though not shown in the figures, a charged UAV pack may deploy the cable and the mothership 10 may approach the charged UAV pack from behind and position itself so that it can connect to the cable.

In exemplary embodiments as described in more detail below charging aircraft 55 may be docked to the mothership. In alternative embodiments, charging aircraft 55 may transfer electric charge to mothership 10 through the cable 60.

When the mothership 10 and charging aircraft 55 are connected via cable 60, a number of flight control strategies may be employed to prevent the two aircraft from contacting each other and to coordinate their uniform flight movements. In exemplary embodiments, the charging aircraft may be independently controlled either manually or by remote control. In accordance with alternative exemplary embodiments, signals reflecting control inputs from the pilot of the mothership 10 can be wirelessly transmitted to the control actuators of the charging aircraft, which in turn, control the movement and/or positioning of corresponding charging aircraft flight control surfaces. Processing the signals that reflect the pilot control inputs may occur on the mothership's flight computer, after which, the processed signals are transmitted to the control actuators of the charging aircraft. Alternatively, the signals that reflect the control inputs from the pilot of the mothership 10 may be transmitted to the charging aircraft and processed by the charging aircraft onboard flight computer before being transmitted to the control actuators of the charging aircraft. For example, if the pilot of the mothership 10 commands the mothership 10 to bank left, corresponding signals will be wirelessly transmitted to the charging aircraft to control the charging aircraft to similarly bank left. Of course, if the charging aircraft deploys the cable 60, and the mothership 10 connects to the cable 60 from behind the charging aircraft, as alternatively proposed above, the signals reflecting the pilot's control inputs would be similarly transmitted to the charging aircraft, which is out in front of the mothership 10, wherein the charging aircraft would then execute the desired maneuver in advance of the mothership 10 in a coordinated fashion.

In addition to coordinating the flight movements between the mothership and the charging aircraft, it is possible to also coordinate the propulsion of the two aircrafts when the two are flying in close proximity to one another or flying while connected by cable. The cable connection between the charging aircraft and the mothership must at least provide an electrical connection, but it does not necessarily have to provide a strong mechanical connection. This is because one propulsion strategy is to have the mothership sending velocity commands to the charging aircraft, and by comparing speeds and/or measuring tension on the cable. For example, through the use of a strain gauge, it is possible for the trailing aircraft (either the mothership or the charging aircraft) to provide just enough forward propulsion to keep a desired tension or amount of slack in the cable so that there is always an electrical connection, but the leading aircraft is not pulling, or towing the following aircraft. This strategy is desirable in that the two aircrafts have some slack and additional freedom of movement relative to each other to prevent jerking on the cable or other forceful feedback that could be transmitted by either flying aircraft to the other. It is also possible for the cable to instead provide a strong mechanical connection in addition to the electrical connection between the two aircraft. In this way, the leading aircraft may partially or completely tow the following aircraft while electricity and/or fuel is flowing through the cable from the charging aircraft to the mothership. Such a towing arrangement may be desirable in certain missions and routes of flight.

Figures 11A, 11B:
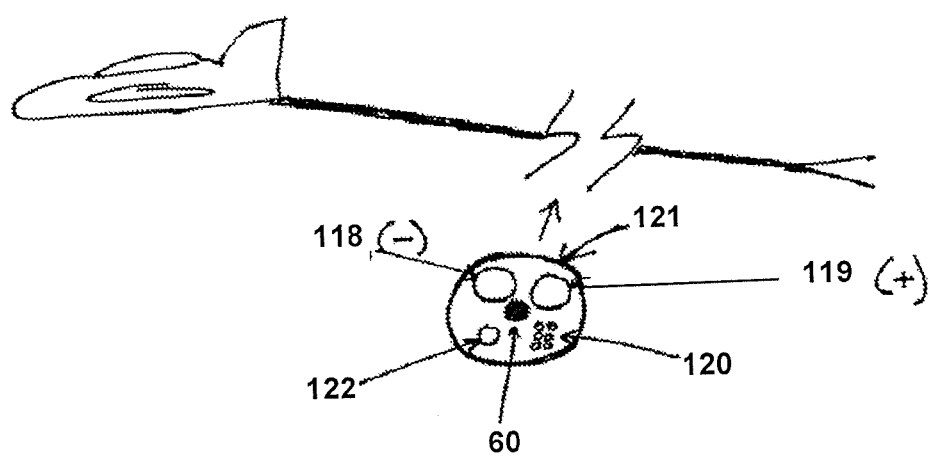
FIGS. 11(a)-11(b) illustrate exemplary embodiments of towing cable, in accordance with aspects of the present invention.

In exemplary embodiments, deployable cable 60 may include a towing strength cable. Any suitable material for towing may be used. Illustrative examples are provided in FIGS. 11(*a*)-(*b*). In an exemplary embodiment the towing strength cable may be a steel cable. In an exemplary embodiment, cable 60 may include a steel cable along with other components. In one embodiment cable 60 further includes electrical wires or cables for positive 118 and negative 119 charge. Cable 60 may also include sub-cables 120, which may be any one or more of telemetry cables, data cables, cables to download data from the mothership, and cables to allow the mothership to control the charging aircraft or vice versa. The outer surface of cable 60 may include an abrasion resistant material 121.

As shown in FIGS. 12(*a*)-(*c*), cable 60 may also be equipped with a flight control apparatus to stabilize the connecting portion and thus aid in the connection with the charging aircraft. A flight control apparatus can aid in making the connection between the mothership and the charging aircraft by affecting one or more of pitch, yaw, and roll of at least a portion of cable 60. The flight control apparatus may be designed to be controlled by the mothership. In an alternative embodiment the flight control apparatus may be designed to be controlled by the charging aircraft. In yet another embodiment, the flight control apparatus may be designed to be controlled by the mothership and the charging aircraft. The controls may be automated or manual. Manual operation would require the human operation. The flight control apparatus may be controlled wirelessly. The flight control apparatus may be controlled via a cable connection provided in cable 60. In one embodiment, the flight control apparatus operates autonomously. The flight control apparatus may also be part of a aerodynamically stabilizing design that provides aerodynamic stability to at least at portion of cable 60. The flight control apparatus may be adjusted based on movements of the mothership. The flight control apparatus may be adjusted based on movements of the charging aircraft. The flight control apparatus may be further be adjusted based on signals received by one or more sensors provided on the mothership, the charging aircraft, cable 60, or any combination thereof. The flight control apparatus may include one or more wings 124. FIG. 12(*a*) provides an illustrative example of a flight control apparatus comprising wings 124. The wings may be provided with controllable features such as ailerons, flaps, elevator, and/or rudder. These controllable features may be operated by hydraulics, electrically, using electromagnets or electric mechanism actuators. Hydraulics and/or electrical signals to operate mechanical controls of flight control apparatus may be provided through a line integrated in cable 60. The wings may be designed to provide aerodynamic stability. In one embodiment the flight control apparatus may include one or more thrusters 123. In exemplary embodiments, the thrusters are actuated in response to input from at least one sensor or based on movements of the mothership and/or charging aircraft or by manual operation. The flight control apparatus may also include CO2 canisters. FIGS. 12(*b*)-(*c*) provide an illustrative example of a flight control apparatus comprising a thruster and/or CO2 canisters. As shown for example in FIGS. 12(*b*)-(*c*), the thruster can emit gas through nozzles positioned 360 degrees around cable 60 to control the position of the cable and of the connection mechanism. CO2 or other compressed gas to operate the thruster or canisters may be supplied to the flight control apparatus via a gas line that may be incorporated in cable 60. In exemplary embodiments, the flight control apparatus may include a combination of one or more wings and one or more thrusters. Also, in exemplary embodiments, the flight control apparatus is located proximal to an end of cable 60 where a recharge connection mechanism 90 is located. In exemplary embodiments, the flight control apparatus is integrated with the recharge connection mechanism. In yet another embodiment the flight control apparatus is located along the length of cable 60.

As shown in FIG. 13, deployable cable 60 may be attached to an aircraft, such as the mothership, at an upstream end "A", and includes a recharging connection mechanism 90 at the downstream end. In an exemplary embodiment, deployable cable 60 is mechanically and electrically connected to the mothership. Cable 60 may be of a fixed length and mechanically connected to the aircraft so that it remains at its fixed length when deployed. Alternatively, cable 60 may be deployed using a reeling device such as a winch. The reeling device may include gear assemblies and can be powered by electric, hydraulic, pneumatic or internal combustion drives. The reeling device may also include a solenoid brake and/or a mechanical brake or ratchet and pawl device that prevents it from unwinding unless the pawl is retracted. Once connected at "B" or the charging aircraft, the towing cable 60 may be reeled in at least in part to bring the two aircrafts closer.

To secure the connection between the two aircrafts, cable 60 can include a mechanism for connecting to the approaching or second aircraft. The mechanism for connecting, also referred to herein as the recharging connection mechanism 90 may provide for securely connecting cable 60 to a charging aircraft and to provide the flow path of energy and/or fuel. The charging aircraft can be equipped with the appropriate contact to engage the recharging connection mechanism 90. FIGS. 14(*a*)-(*b*) illustrate an exemplary embodiment of recharging connection mechanism 90. In an exemplary embodiment the recharging connection mechanism 90 may include a boomerang design or "V" shaped clamp 125. The recharging connection mechanism may have a boomerang design or V-shaped clamp that may be designed to trigger when closing in or in proximity to the connecting aircraft. Alternatively, the connection mechanism may be designed to trigger upon contact with the connecting aircraft. The recharging connection mechanism may include a latch to lock down the connection. When triggered the recharging connection mechanism locks into position. Upon locking the recharging connection mechanism may also establish an electrical and/or fuel connection. The recharging connection mechanism, or latch thereon, may be triggered to make the connection using a gas, for example CO2. Alternatively the recharging connection mechanism, or latch thereon, may be triggered using a spring, hydraulic, electrical actuator, electromagnetic element, or other suitable device. A mechanical connection may also be achieved magnetically. The second aircraft, for example the charging aircraft, may be equipped with a receiving device or reciprocal mechanism for receiving connection mechanism 90. In exemplary embodiment, the receiving device or reciprocal mechanism for receiving connection mechanism 90 is an engagement mechanism such as charging blade 91 that is able to connect to recharging connection mechanism 90. Charging blade 91 may include guide wires 128 that also form a "V" shaped outline. In an exemplary embodiment, recharging connection mechanism 90 is used to transfer a charge from the charging aircraft to the mothership to replenish the depleted batteries on the mothership. In this latter embodiment, recharging connection mechanism 90 may include positive and negative contacts 126. The V-shaped engagement mechanism may be designed to snap shut onto a charging blade provided on the charging aircraft. A mechanical latch may be provided at position "X" shown in FIG. 14(b). The latch may be designed to allow in flight pivoting of the contacts along the recharging arcing contacts 127. Although the exemplary embodiment is shown for providing electrical energy, it should be understood that a similar set up can be used also to provide fuel transfer or a mix of fuel and electrical energy transfer. Also, while the embodiment has been described as the mothership having cable 60 and the charging aircraft having charging blade 91, it should be understood that the converse may also be implemented where the charging aircraft is equipped with a cable 60 mechanically and electrically connected to the charging aircraft and the mothership is equipped with a charging blade to allow for connection by the recharging connection mechanism at the distal end of deployable cable 60 and still have the energy or fuel transfer from the charging aircraft to the mothership.

The towing strength cable integrated in cable 60, allows the mothership to tow the charging aircraft the recharging connection mechanism 90 is engaged with the charging aircraft. In an alternative embodiment the charging aircraft may include a cable 60 that connects to and thus tows the mothership. In exemplary embodiments the towing aircraft may fully tow the towed aircraft such that no supplemental engine thrust is required by the towed aircraft. In alternative embodiments the towing aircraft only partially tows the towed aircraft. In such alternative embodiment, the towed aircraft may provide at least some degree of thrust. During the towing phase, the aircraft being towed, either the charging aircraft or the mothership, may engage in regenerating energy. In exemplary embodiments, the towed aircraft may continue to provide propulsion even though it is being towed. Alternatively, the towed aircraft may provide no additional propulsion while being towed. An exemplary embodiment is shown in FIG. 15. The towed aircraft may engage the regeneration mode in the electric motor controller to capture wind-milling action of the propeller to turn electric motor shaft and generate electricity to either store or recharge the battery. In an exemplary embodiment, the regenerated energy may be transferred to the towing aircraft to replenish the battery of the towing aircraft. In an exemplary embodiment the energy regeneration is achieved using a Ram Air Turbine ("RAT") 129.

In an exemplary embodiment illustrated in FIGS. 16(a)-(c), cable 60 may include two portions, a towing cable only portion 130 and a towing and recharging portion 131. In one embodiment the towing and recharging portion is less than the total length of cable 60. In this exemplary embodiment, cable 60 may first be deployed to a length that allows for safe connection and then reeled in to complete a connection that allows for the transfer of energy. In an exemplary embodiment, cable 60 is deployed by the mothership. Cable 60 can then connect to charging aircraft through a recharging connection mechanism. Once connected, the mothership may use a reel 135 to reel in at least a portion of cable 60 while towing the charging aircraft until contact 136 of the recharging portion 131 engages contact block 132 located on, in or in close proximity to the mothership. Once the contact block 132 is engaged, the electrical energy and/or fuel is transferred. In one embodiment, once the contact block is engaged, an electrical path is created between the mothership and the charging aircraft. In exemplary embodiments, the charging aircraft is towed by the mothership. In alternative embodiment, the mothership is towed by the charging aircraft. The arrangement should not be viewed as limited as cable 60, described herein, can be employed by either aircraft. Thus, in exemplary embodiments cable 60 is deployed by charging aircraft to connect with the mothership and then reeled in by the charging aircraft until the towing and charging portion engages a contact block located on, in or in close proximity to the charging aircraft. Moreover, in exemplary embodiments, once the charge or fuel has been transferred, the two aircrafts, i.e. mothership and charging aircraft, are disengaged. More specifically, the recharging connection mechanism disengages and cable 60 is reeled in completely by the deploying aircraft. In an exemplary embodiment as described in FIGS. 16(a)-(c), prior to disengagement, cable 60 may be extended back to a safe distance length.

The electrical recharging source may include different embodiments. In one embodiment the recharging source may be a DC-DC battery charge. In an embodiment where the charging aircraft is provided with an energy storage medium such as a battery, capacitor, or other device that can store energy. The energy storage medium can be the source of the electrical energy to recharge the battery, or other similar energy storage medium, of the mothership. In exemplary embodiments, it is preferable that the charge of the energy storage medium, i.e. battery, capacitor or the like, used as the source have a higher voltage than the voltage of the depleted energy storage medium, i.e. battery, capacitor or the like, on the mothership that is to be recharged. In another embodiment the recharging source may include a ram air turbine. Another example of recharging source may be a generator located on board of the charging aircraft. Another exemplary recharging source may be a fuel cell. For example the generator may include a turbine auxiliary power unit ("APU"). Another example is an internal combustion engine mechanically turning an electrical generator. Also, the aircraft engine power may provide regeneration by turning an alternator or generator. It should also be understood that combinations of two or more recharging sources and/or in combination with regenerative energy as described earlier may also be employed. Also, exemplary embodiments involving electrical recharge may further include means for regulating the electrical current during the transfer from one aircraft to the other. One exemplary means for regulating the electrical current may be the use of a length of resistance wire to conduct the electricity from the charging aircraft to the mothership. Another example of means for regulating the electrical current may include an electronic current controller that may use an insulated-gate bipolar transistor ("IGBT"). Other means of regulating electrical current may also be employed. The means for regulating current during transfer may be integrated into cable 60. Alternatively, the means for regulating the current during transfer may be located either on the mothership or the charging aircraft. Also, a combination of multiple regulating means may be employed.

In exemplary embodiments, the charging aircraft may also become the battery or fuel pack of the mothership. In such embodiments, cable 60 may be used to connect the mothership to the charging aircraft as discussed above. Cable 60 may then be reeled in so as to bring the charging aircraft close to the mothership. The charging aircraft may then connect to the mothership electrically as well as mechanically, either outside the mothership or inside the bay or compartment of the mothership, as described above with respect to UAV packs.

FIGS. 8(a)-(d) illustrate exemplary embodiments wherein charging aircraft 55 connects to the mothership 10 through an extendible boom or telescopic arm 65. Like cable 60, extendible boom or telescopic arm 65 may be designed to have a towing capacity such as for example by incorporation of a steel cable. The mothership 10 may have the capability to withdraw the boom after a charge has been transferred and the charging aircraft is disconnected, and extend the boom upon the arrival of a new charging aircraft or replacement UAV pack. It will be understood that the transfer of electric charge from the charging aircraft to the mothership 10 may occur through the extendible boom 65. Alternatively, though not shown in the figures, a charging aircraft may deploy the extendible boom and the mothership 10 may approach the charging aircraft from behind and position itself so that it can connect to the extendible boom. After which time, the electric charge may be transferred from the charging aircraft to the mothership 10 through the extendible boom.

In exemplary embodiments, the charging aircraft would likely be equipped with its own propulsion system such as an electric motor and propeller, a jet engine, a rocket motor, or the like, thus allowing the charging aircraft to take off and fly, under its own power, to a rendezvous point with the mothership in order to dock with and recharge the mothership, as described above. For ease and safety of docking, charging aircraft, when docking with the mothership, should preferably be at a constant trajectory, altitude and speed. This is best achieved when the charging aircraft does, in fact, employ its own propulsion system.

Nevertheless, it is possible that the charging aircraft does not employ its own propulsion system. For example, in embodiments where the charging aircraft is a UAV pack, the UAV pack may be launched into the air by a catapult, slingshot, or other like devices. Alternately, a UAV pack may be lifted into the air, for example, through the use of a large balloon, a fixed-wing aircraft, helicopter, or by a rocket, to an altitude higher than the rendezvous and docking altitude. The UAV pack would then be dropped and allowed to free-fall until it executes a leveling off maneuver prior to the rendezvous and docking operation with the mothership. A drogue chute may be employed to stabilize the falling UAV pack, and to control descent speed at a predictable and safe velocity.

There are a number of techniques that could be employed to dock a UAV pack with the mothership. As discussed previously, a cable 60 may be used to connect to the UAV pack and then reel the UAV pack in until it can be docked to the mothership. Similarly, cable 60 may be used to connect to a battery back that is not a UAV pack and then reel the battery pack in until it can be docked to the mothership. The battery pack, whether or not a UAV, may also be delivered to the mothership by a charging aircraft that then releases the battery pack once connected to the mothership by cable 60 or telescopic arm 65.

In exemplary embodiments where the battery pack is a UAV pack, the charging aircraft may also deploy the UAV pack that can then fly and dock to the mothership. A UAV pack may fly along a steady trajectory and at a constant altitude and speed, as the mothership may be flown into position to achieve docking. The act of docking may be controlled from or by the mothership, the UAV pack or a combination of both. It may be automated, manual or a combination of both. It may involve a pilot positioned in the mothership or a remotely located operator. It may involve optics, sensors, and other electro-mechanical, even magnetic devices, all of which, for the purpose of this disclosure, are known in the art. In fact, the mothership may be configured to fly up behind the UAV pack and execute the docking maneuver from a position behind the flying UAV pack. In this way, the pilot of a manned mothership may more easily see and control the docking from the rearward position. As described previously, the UAV pack may dock with the mothership either via cable 60 or telescopic arm 65.

In exemplary embodiments, the charging aircraft may be designed to carry one or more charged battery packs to deliver to the mothership. The one or more charged battery packs may or may not be UAV. A cable 60 or telescopic arm 65 deployed from the mothership may then connect directly to the charged battery pack. The connection to the charged battery pack may be completed prior to the charged battery pack being jettisoned by the charging aircraft. In embodiments using cable 60, the battery pack may then be towed and reeled in close to the mothership so that it can then either dock outside the mothership or be inserted inside the mothership. Likewise, telescopic arm 65 may retract and similarly bring the charged battery pack close to the mothership for docking with or insertion into the mothership. The one or more charged battery packs may also be equipped with flight control apparatus similar to a flight control apparatus 80 described in conjunction with cable 60. Likewise, the same type of control mechanism of any such flight control apparatus may also be employed, i.e. wireless, autonomous, and/or using cable 60 or telescopic arm 65 as a way to transfer control signals. Optionally, during transfer of charged battery packs from the charging aircraft to the mothership, one or more additional cables 60 may be also used to connect the mothership to the charging aircraft. In exemplary embodiments the mothership tows the charging aircraft during the transfer of the charged battery packs.

Figures 17A, 17B:
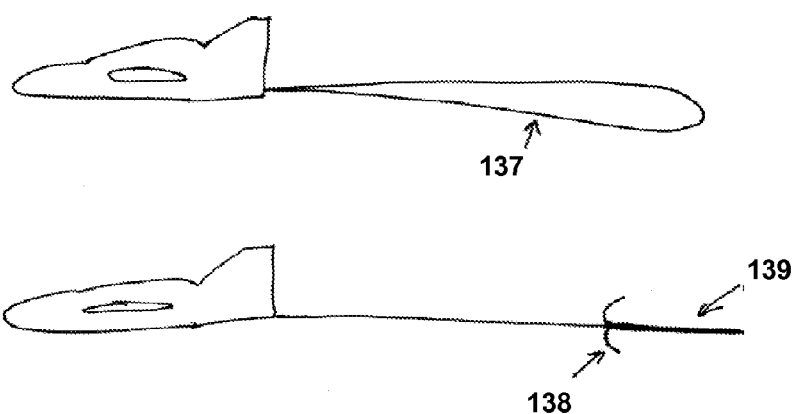
FIG. 17(a)-17(b) illustrates exemplary embodiments of inductive charging, in accordance with aspects of the present invention.

In yet another embodiment, as shown in FIGS. 17(a)-(b), the charging aircraft or mothership may be equipped with an inductive loop 137 or platform 139 that can be engaged by the other aircraft. For example, the mothership may engage a loop or land on a platform or perch connected to the charging aircraft. In an exemplary embodiment using a loop, the loop will start and end at the same aircraft. The connection of the platform or the loop may be achieved using a cable 60 that is designed for inductive recharging as well as towing. The platform or perch 139 may also be equipped with an optional wind blocker 138. The mothership may be able to engage the loop through a hook like mechanism that can secure the connection and allow for the transfer of energy. Likewise, the mothership can be designed to land on and engage the platform or perch so that it is securely positioned on the platform or perch during the inductive charging. In an exemplary embodiment, the mothership may be a UAV. The process and controls necessary to accomplish charging through inductance are not particularly limited and are known in the art. For example, such controls are described in U.S. Pat. Nos. 7,318,564 and 5,311,973, both of which are hereby incorporated by reference in their entirety.

Aircraft expend a significant amount of energy during takeoff and climb out. Thus, in accordance with another aspect of the present invention, an optional takeoff assist cart may be employed. The takeoff assist cart would feature its own source of locomotion and connect to the underside of the mothership. The takeoff cart would propel the mothership, including its one or more battery packs and/or docked UAV Packs, down the runway until it reaches a safe takeoff speed. Upon liftoff, the mothership will separate from the takeoff cart, which remains on the ground, while the mothership, including its one or more battery packs and/or docked UAV packs, gains altitude and proceeds along its flight plan, and in accordance with any one or more of the first, second and/or third exemplary embodiments described above. The takeoff cart can be recovered and reused for a subsequent launch. FIGS. 9(a)-(d) depict a mothership 10 along its pitch (a), roll (b) and yaw (c) axes, and in perspective view (*d*), where the mothership 10 is connected to a takeoff cart 70. Another advantage of using a takeoff cart is the reduction of the weight of the landing gear structure of the mothership. In the preferred embodiment, the mothership is powered by rotating propellers. In certain designs, it is ideal for such propellers to be a large diameter. In order to clear the ground during takeoff, a tall landing gear apparatus would be required along with its associated weight and in-flight retraction mechanisms and structure. With electric airplane design, it is ideal to keep weight to a minimum and so a takeoff cart may obviate the need for a very tall landing gear apparatus to be installed. During landing operations, a much lower profile landing gear or series of small wheels on the underside of the mothership may emerge to provide a means for landing. The need for propeller clearance during landing is dispatched because electric motors can be commanded to very precise positions rotationally, and a method of commanding the electric motor(s) to "park" the propeller(s) in a horizontal and fixed position in the moments just before touchdown will allow the propellers to be hidden co-planar with the wing or cowling and stopped from rotating, thus enabling a low profile landing configuration.

It is noted that the above described mechanism used to replace depleted batteries may also be used to collect and deliver any type of UAV or manned aircraft from a mothership. For example, a mothership aircraft may be designed to carry one or more secondary aircrafts. As discussed above, the mothership may be itself a UAV. Alternatively, the mothership may be a manned aircraft. The mothership may also be an electrical, hybrid or fuel aircraft.

The secondary aircrafts may also either be UAVs or manned aircrafts. The secondary aircrafts may also be electrical, hybrid or fuel aircrafts.

The mothership may be designed to transport the secondary aircrafts to a given location. As described above with respect to the battery packs, the secondary aircrafts may be carried either inside the mothership or docked outside of the mothership. Exemplary embodiments also include a combination of secondary aircrafts carried inside the mothership and secondary aircrafts docked outside the mothership.

Once at a desired location, one or more of the secondary aircrafts may be released in a manner similar to the process described earlier with respect to the release or jettisoning of depleted battery packs.

The secondary aircrafts may be designed to have a variety of functions. In exemplary embodiments the secondary aircrafts may be used as delivery systems for goods, data, or other services. The secondary aircrafts may also be used to survey a given area. The secondary aircrafts may either be preprogrammed to perform a given function. Alternatively, the secondary aircrafts may be designed to receive and transmit information wirelessly. The secondary aircrafts may also be controlled remotely. In exemplary embodiments, the secondary aircrafts may include some autonomous functions and some remote control functions. The control of the secondary aircrafts may be accomplished from the mothership. Alternatively, the secondary aircrafts may be controlled from location other than the mothership. The mothership may remain in communication with the secondary aircrafts even after the secondary aircrafts have been released.

Once the secondary aircrafts have performed their function or in the event the given task to be performed is interrupted, the secondary aircrafts may be designed either to fly to a given location either on land, land structure, a land vehicle, water, a watercraft, water structure, or an aircraft. In exemplary embodiments, the secondary aircrafts can be instructed to return to the mothership once their task is complete or in the event the task to be performed is interrupted. In an exemplary embodiment, one or more of the secondary aircrafts may also fly to an aircraft other than the mothership from which they were deployed.

An example of a scenario where a task is interrupted may be malfunction of the secondary aircraft, intentional cancellation of the task, depleted energy of the secondary aircraft, emergency, intentional recall of the secondary aircraft and the like. This list of reasons should not be viewed as an exhaustive list and it should be understood that any number of reasons may arise to terminate a task prior to completion.

The secondary aircrafts may dock back with the mothership in the same manner as described previously with respect to docking charged battery packs to the mothership to replace the depleted battery packs. In exemplary embodiments, the secondary aircrafts may dock to the mothership or like aircraft using cable 60. In alternative embodiments the docking may be performed via telescoping arm 65. To the extent the secondary aircrafts only require a recharge or refueling, the same techniques using cable 60 or arm 65 may also be used where the mothership or other aircraft can act as the charging aircraft. In an exemplary embodiments one secondary aircraft may operate as the charging aircraft of another secondary aircraft.

The secondary aircrafts may be designed to be deployed only once per flight of the mothership. Alternatively, the secondary aircrafts may be deployed two or more times during a flight of the mothership. In embodiments where the secondary aircrafts are used to deliver packages, for example, after delivery of one or more packages, the secondary aircrafts can return to the mothership or go to another aircraft to receive additional packages and then be released to deliver the new packages.

The present invention has been described above in terms of a preferred embodiment and one or more alternative embodiments. Moreover, various aspects of the present invention have been described. One of ordinary skill in the art should not interpret the various aspects or embodiments as limiting in any way, but as exemplary. Clearly, other embodiments are well within the scope of the present invention. The scope the present invention will instead be determined by the appended claims.

I claim:

1. A system for regenerating electricity in at least one flying aircraft comprising:
   a deployable cable connected to a first aircraft, the cable comprising an upstream end and a downstream end;
   the upstream end of the cable comprising a mechanical connection to a reeling device onboard the first aircraft;
   the downstream end of the cable comprising a flight control surface and a first mechanism for connecting to a second aircraft, the second aircraft having at least one Ram Air Turbine ("RAT") and an energy storage medium;
   a reciprocal mechanism connected to the second aircraft for receiving the connection mechanism of the cable;
   wherein the cable is designed to allow the first aircraft to tow the second aircraft when it is connected to the second aircraft and wherein the RAT is designed to regenerate energy for the energy storage medium when the second aircraft is being towed.

2. The system of claim 1 further comprising a device to regulate electrical current during any transfer of electricity between first and second aircraft.

3. The system of claim 1 wherein the first mechanism is activated by contact.

4. The system of claim 1 wherein the first mechanism is activated by proximity.

5. The system of claim 1 wherein the first mechanism comprises a spring operated latch.

6. The system of claim 1 wherein the first mechanism comprises a gas operated latch.

7. The system of claim 1 wherein the first mechanism comprises a hydraulically operated latch.

8. The system of claim 1 wherein the first mechanism comprises an electrical actuator.

9. The system of claim 1 wherein the first mechanism comprises an electromagnetic element.

10. The system of claim 1 wherein a portion of the cable with provisions for providing electrical connectivity between the first and second aircraft is less than the total length of the cable.

11. A system for regenerating electricity in at least one flying aircraft comprising:
   a deployable cable connected to a first aircraft, the cable comprising an upstream end and a downstream end;
   the upstream end of the cable comprising a mechanical connection to a reeling device onboard the first aircraft;
   the downstream end of the cable comprising a thruster and a first mechanism for connecting to a second aircraft, the second aircraft having at least one Ram Air Turbine ("RAT") and an energy storage medium;
   a reciprocal mechanism connected to the second aircraft for receiving the connection mechanism of the cable;
   wherein the cable is designed to allow the first aircraft to tow the second aircraft when it is connected to the second aircraft and wherein the RAT is designed to regenerate energy for the energy storage medium when the second aircraft is being towed.

12. The system of claim 11 wherein the thruster is powered by at least one compressed gas.

13. The system of claim 11 wherein the thruster is designed to be actuated in response to input from at least one sensor.

14. A method for regenerating electricity in at least one flying aircraft comprising:
   deploying a cable from a first aircraft using a reeling device, the cable having an upstream end connected to the reeling device and a downstream end;
   connecting the downstream end of the cable to a second aircraft during flight, wherein the second aircraft comprises at least one propeller and an energy storage medium and wherein the first aircraft provides a thrust to tow the second aircraft after the connection is made; and
   regenerating electricity for the energy storage medium on the second aircraft using a windmilling action of the at least one propeller.

* * * * *